United States Patent
Harada

(10) Patent No.: US 12,483,803 B2
(45) Date of Patent: Nov. 25, 2025

(54) POSITION DETECTION DEVICE, LENS MODULE, IMAGING APPARATUS, AND ANGLE SENSOR APPARATUS

(71) Applicant: TDK CORPORATION, Tokyo (JP)

(72) Inventor: Kentaro Harada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 63 days.

(21) Appl. No.: 18/666,103

(22) Filed: May 16, 2024

(65) Prior Publication Data

US 2024/0397218 A1    Nov. 28, 2024

(30) Foreign Application Priority Data

May 26, 2023 (JP) .................... 2023-086690

(51) Int. Cl.
*H04N 25/47* (2023.01)
*H04N 23/54* (2023.01)

(52) U.S. Cl.
CPC ............. *H04N 25/47* (2023.01); *H04N 23/54* (2023.01)

(58) Field of Classification Search
CPC .................... H04N 23/54; H04N 25/47
See application file for complete search history.

(56) References Cited

U.S. PATENT DOCUMENTS

| | | | |
|---|---|---|---|
| 9,933,281 B2 | 4/2018 | Nomura | |
| 10,712,178 B2 * | 7/2020 | Uchida | G01D 5/145 |
| 11,204,263 B2 | 12/2021 | Umehara et al. | |
| 11,614,342 B2 | 3/2023 | Cai | |
| 2020/0153366 A1* | 5/2020 | I | H04N 23/54 |
| 2021/0255000 A1* | 8/2021 | Cai | G01D 5/147 |
| 2022/0159170 A1* | 5/2022 | Platner | G06F 1/1626 |

FOREIGN PATENT DOCUMENTS

| | | |
|---|---|---|
| JP | 2009-192261 A | 8/2009 |
| JP | 2009-276262 A | 11/2009 |
| JP | 2012-247298 A | 12/2012 |
| JP | 2016-156631 A | 9/2016 |
| JP | 2019-082445 A | 5/2019 |
| JP | 2019-128192 A | 8/2019 |
| JP | 2022-51418 A | 3/2022 |
| WO | 2018/051729 A1 | 3/2018 |

* cited by examiner

*Primary Examiner* — Amy R Hsu
(74) *Attorney, Agent, or Firm* — Oliff PLC

(57) ABSTRACT

A position detection device includes: a first magnetic field generator generating a first magnetic field; a driver opposed to the first magnetic field generator in a first-axis direction; and a magnetic field sensor detecting the first magnetic field. The driver causes the first magnetic field generator to move in a second-axis direction parallel to a first plane orthogonal to the first-axis direction. The first magnetic field generator is movable in the second-axis direction with respect to the driver and the magnetic field sensor. The driver is spaced from and overlaps a part of the first magnetic field generator in the first-axis direction, and extends across the part of the first magnetic field generator in a third-axis direction parallel to the first plane and orthogonal to the second-axis direction. A center position of the magnetic field sensor in the third-axis direction is different from that of the first magnetic field generator.

26 Claims, 25 Drawing Sheets

POSITION DETECTION DEVICE, LENS MODULE, IMAGING APPARATUS, AND ANGLE SENSOR APPARATUS

CROSS-REFERENCE TO RELATED APPLICATIONS

The present application claims priority from Japanese Patent Application No. 2023-086690 filed on May 26, 2023, the entire contents of which are hereby incorporated by reference.

BACKGROUND

The disclosure relates to a position detection device, a lens module, an imaging apparatus, and an angle sensor apparatus that each include a magnetic field sensor.

A position detection device including a magnetic field sensor has been proposed. The Applicant has proposed, for example, a camera module including a position detection device. For example, reference is made to Japanese Unexamined Patent Application Publication No. 2019-082445. In the proposed camera module, the position detection device detects the position of a lens that moves in performing focusing. WO 2018/051729 A1 proposes a lens driving device including a position detecting magnet and a magnetism detection member. The position detecting magnet detects a movement position of a lens holding member.

SUMMARY

A position detection device according to an embodiment of the disclosure includes a first magnetic field generator, a driver, and a magnetic field sensor. The first magnetic field generator generates a first magnetic field. The driver is opposed to the first magnetic field generator in a first-axis direction and configured to generate a driving force to thereby cause the first magnetic field generator to move in a second-axis direction parallel to a first plane orthogonal to the first-axis direction. The magnetic field sensor is configured to detect a magnetic field component, of the first magnetic field, that is parallel to the first plane. The first magnetic field generator is movable in the second-axis direction with respect to the driver and the magnetic field sensor. The driver is spaced from and overlaps a part of the first magnetic field generator in the first-axis direction, and extends across the part of the first magnetic field generator in a third-axis direction parallel to the first plane and orthogonal to the second-axis direction. A center position of the magnetic field sensor in the third-axis direction is different from a center position of the first magnetic field generator in the third-axis direction.

A lens module according to an embodiment of the disclosure includes a first magnetic field generator, a driver, a magnetic field sensor, and a lens. The first magnetic field generator generates a first magnetic field. The driver is opposed to the first magnetic field generator in a first-axis direction and configured to generate a driving force to thereby cause the first magnetic field generator to move in a second-axis direction parallel to a first plane orthogonal to the first-axis direction. The magnetic field sensor is configured to detect a magnetic field component, of the first magnetic field, that is parallel to the first plane. The first magnetic field generator and the lens are movable together in the second-axis direction with respect to the driver and the magnetic field sensor. The driver is spaced from and overlaps a part of the first magnetic field generator in the first-axis direction, and extends across the part of the first magnetic field generator in a third-axis direction parallel to the first plane and orthogonal to the second-axis direction. A center position of the magnetic field sensor in the third-axis direction is different from a center position of the first magnetic field generator in the third-axis direction.

An imaging apparatus according to an embodiment of the disclosure includes an imaging element and a lens module. The lens module includes a first magnetic field generator, a driver, a magnetic field sensor, and a lens. The first magnetic field generator generates a first magnetic field. The driver is opposed to the first magnetic field generator in a first-axis direction and configured to generate a driving force to thereby cause the first magnetic field generator to move in a second-axis direction parallel to a first plane orthogonal to the first-axis direction. The magnetic field sensor is configured to detect a magnetic field component, of the first magnetic field, that is parallel to the first plane. The first magnetic field generator and the lens are movable together in the second-axis direction with respect to the driver and the magnetic field sensor. The driver is spaced from and overlaps a part of the first magnetic field generator in the first-axis direction, and extends across the part of the first magnetic field generator in a third-axis direction parallel to the first plane and orthogonal to the second-axis direction. A center position of the magnetic field sensor in the third-axis direction is different from a center position of the first magnetic field generator in the third-axis direction.

An angle sensor apparatus according to an embodiment of the disclosure includes a rotating member and a position detection device. The position detection device includes a first magnetic field generator, a driver, and a magnetic field sensor. The first magnetic field generator is provided on the rotating member and generates a first magnetic field. The driver is opposed to the first magnetic field generator in a first-axis direction and configured to generate a driving force to thereby cause the first magnetic field generator and the rotating member to rotate in a second-axis direction parallel to a first plane orthogonal to the first-axis direction. The magnetic field sensor is configured to detect a magnetic field component, of the first magnetic field, that is parallel to the first plane. The first magnetic field generator and the rotating member are movable in the second-axis direction with respect to the driver and the magnetic field sensor. The driver is spaced from and overlaps a part of the first magnetic field generator in the first-axis direction, and extends across the part of the first magnetic field generator in a third-axis direction parallel to the first plane and orthogonal to the second-axis direction. A center position of the magnetic field sensor in the third-axis direction is different from a center position of the first magnetic field generator in the third-axis direction.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
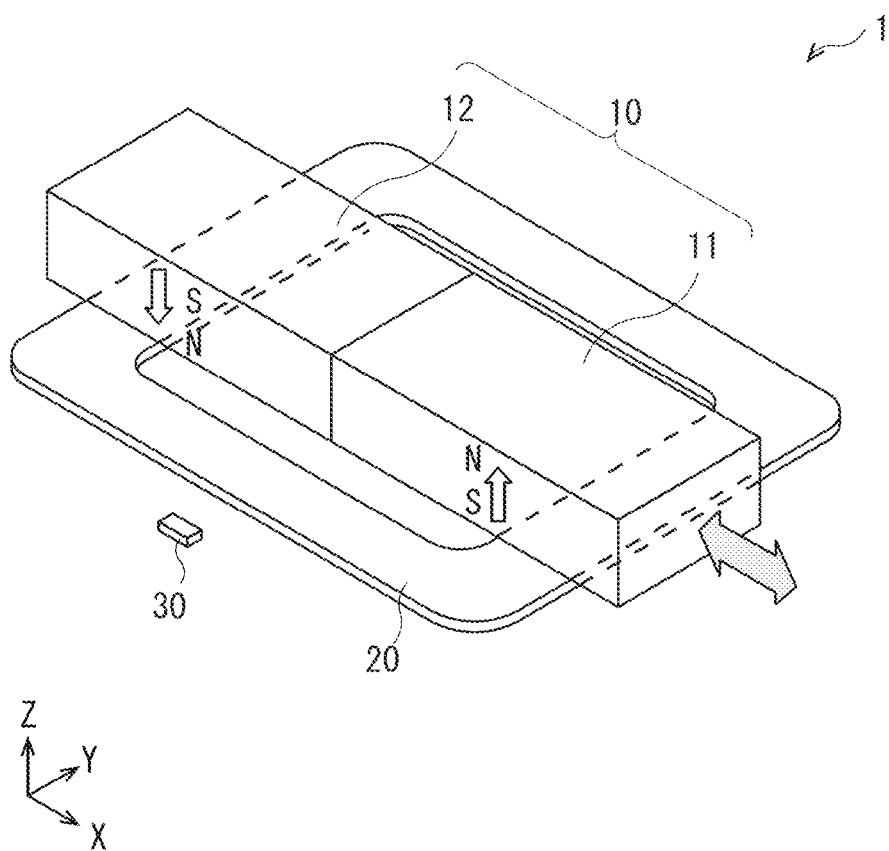
FIG. 1A is a perspective diagram illustrating a configuration example of a position detection device according to one example embodiment of the disclosure.

It is desired that a position detection device including a magnetic field sensor achieve higher position detection accuracy.

It is desirable to provide a position detection device, a lens module, an imaging apparatus, and an angle sensor apparatus that each make it possible to achieve superior detection performance.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings. Note that the description is given in the following order.

1. First Example Embodiment

An example of a position detection device including a magnet that is movable in a direction in which a first magnetized region and a second magnetized region are adjacent to each other.

2. Second Example Embodiment

An example of a position detection device including a magnet that includes a third magnetized region between the first magnetized region and the second magnetized region.

3. Third Example Embodiment

An example of a position detection device including a magnet that includes an unmagnetized region between the first magnetized region and the second magnetized region.

4. Fourth Example Embodiment

An example of a position detection device including a magnet in which the first magnetized region and the second magnetized region have their respective opposed surfaces each including a chamfered part.

5. Fifth Example Embodiment

A first example of a position detection device including a single magnet and two driving coils.

6. Sixth Example Embodiment

A second example of the position detection device including the single magnet and the two driving coils.

7. Seventh Example Embodiment 7-1. Basic Configuration Example

An example of an imaging apparatus including a lens module. The lens module includes a first magnetic field generator, a second magnetic field generator, and a magnetic field sensor. The first magnetic field generator generates a first magnetic field and moves together with a lens. The second magnetic field generator generates a second magnetic field to be used to drive the lens. The magnetic field sensor detects a position of the lens.

7-2. Modification Example

An example of the imaging apparatus including a lens module. The lens module includes two first magnetic field generators, two second magnetic field generators, and two magnetic field sensors. The two first magnetic field generators generate the first magnetic field and move together with the lens. The two second magnetic field generators generate the second magnetic field to be used to drive the lens. The two magnetic field sensors detect the position of the lens.

8. Other Modification Examples

1. First Example Embodiment

[Configuration of Position Detection Device 1]

A description will be given first of a configuration of a position detection device 1 according to a first example embodiment of the disclosure with reference to FIGS. 1A to 1C.

FIG. 1A is a perspective diagram illustrating an overall configuration example of the position detection device 1. FIG. 1B is a cross-sectional diagram illustrating a cross-sectional configuration example of the position detection device 1. FIG. 1C is a plan view of the position detection device 1 as viewed from above. Note that FIG. 1B illustrates a cross section as viewed in an arrowed direction along line IB-IB in FIG. 1C. A Z-axis direction, an X-axis direction, and a Y-axis direction in each of in FIGS. 1A to 1C may respectively correspond to specific but non-limiting examples of a "first-axis direction", a "second-axis direction", and a "third-axis direction" in one embodiment of the disclosure. The Z-axis direction, the X-axis direction, and the Y-axis direction may be orthogonal to each other.

Figure 1B:
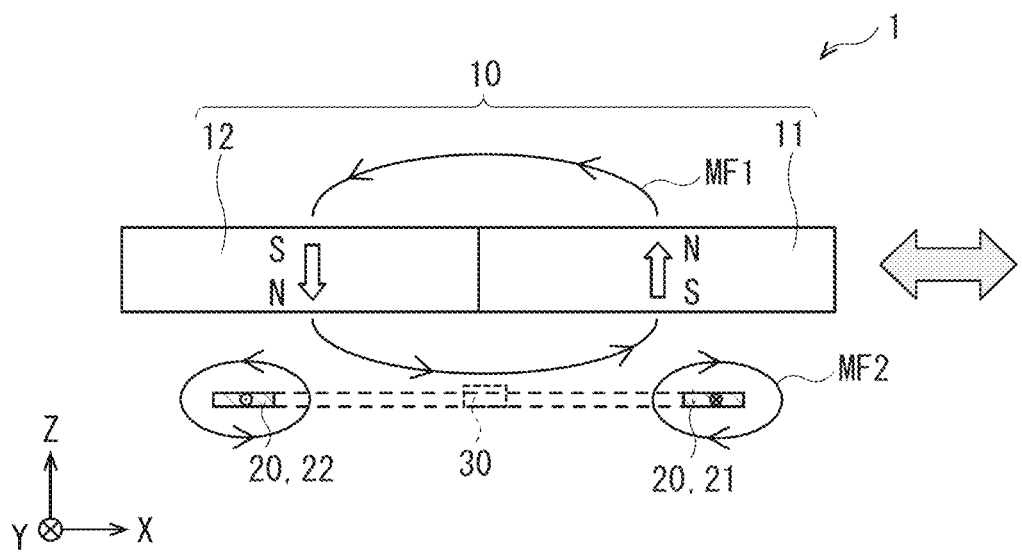
FIG. 1B is a cross-sectional diagram illustrating a cross-sectional configuration example of the position detection device illustrated in FIG. 1A.
Figure 1C:
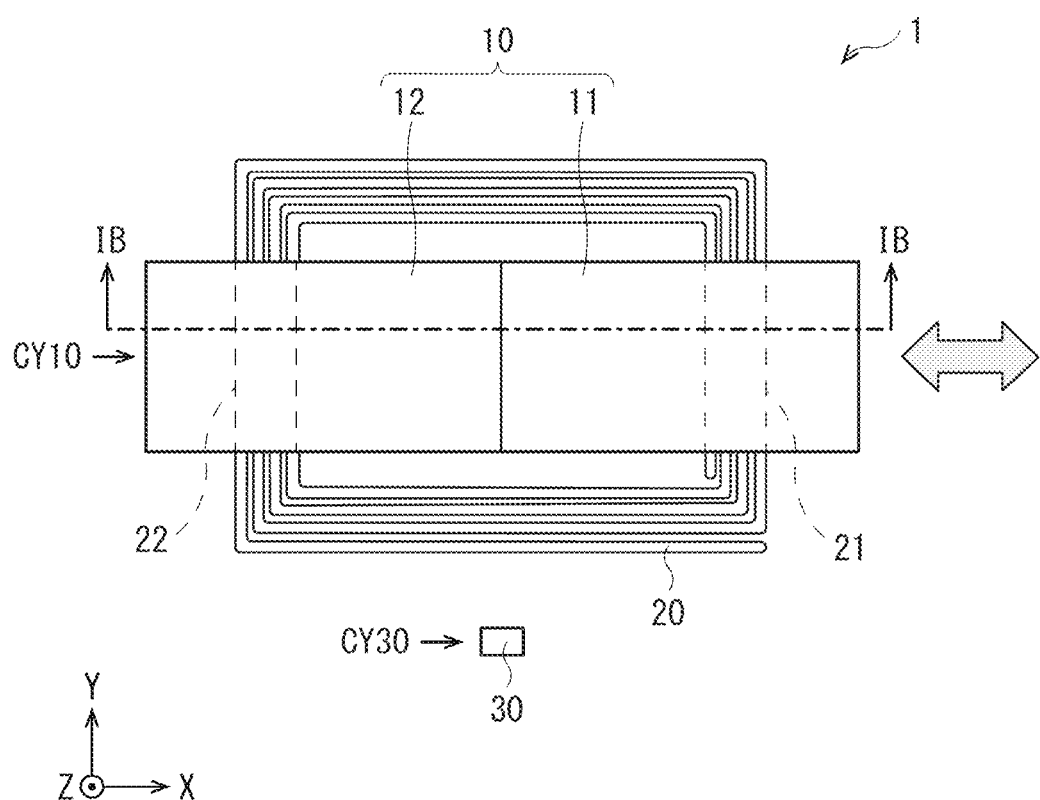
FIG. 1C is a plan view of the position detection device illustrated in FIG. 1A as viewed from above.

As illustrated in FIGS. 1A to 1C, the position detection device 1 includes a magnet 10, a driving coil 20, and a magnetic field sensor 30. The magnet 10 may correspond to a specific but non-limiting example of a "first magnetic field generator" in one embodiment of the disclosure. The driving coil 20 may correspond to a specific but non-limiting example of a "driver" and a "second magnetic field generator" in one embodiment of the disclosure. In the position detection device 1, the magnet 10 and the driving coil 20 may be spaced from and opposed to each other in the Z-axis direction. For convenience, the present example embodiment will be described with the magnet 10 assumed to be located relatively above the driving coil 20 and with the driving coil 20 assumed to be located relatively below the magnet 10.

[Magnet 10]

The magnet 10 may be a permanent magnet having a substantially rectangular parallelepiped shape in appearance, with its longitudinal direction along the X-axis direction, for example. The magnet 10 generates a first magnetic field MF1, as illustrated in FIG. 1B. The first magnetic field MF1 may be exerted on the magnetic field sensor 30. The first magnet 10 may include a ferromagnetic material. Non-limiting examples of the ferromagnetic material usable for the magnet 10 may include a neodymium-based magnet material such as NdFeB and a rare-earth magnet material such as SmCo. The magnet 10 may be reversibly movable in the X-axis direction with respect to the driving coil 20 and the magnetic field sensor 30. The magnet 10 may overlap a part of the driving coil 20 in the Z-axis direction.

The magnet 10 may include a first magnetized region 11 and a second magnetized region 12. The first magnetized region 11 and the second magnetized region 12 may be arranged along the X-axis direction. The first magnetized region 11 may be magnetized in a first direction along the Z-axis direction. The first direction may be a +Z direction. The second magnetized region 12 may be magnetized in a second direction along the Z-axis direction. The second direction may be a −Z direction. For example, in the first magnetized region 11, a side facing toward the driving coil 20 may constitute an S pole, and a side farther from the driving coil 20 may constitute an N pole. Note that embodiments of the disclosure are not limited to a case where the first magnetized region 11 is magnetized exactly in the +Z direction, and may encompass a case where the first magnetized region 11 is magnetized in a direction at an angle in a range from about 5° to about 10° with respect to the +Z direction. In the second magnetized region 12, a side facing toward the driving coil 20 may constitute an N pole, and a side farther from the driving coil 20 may constitute an S pole. Note that embodiments of the disclosure are not limited to a case where the second magnetized region 12 is magnetized exactly in the −Z direction, and may encompass a case where the second magnetized region 12 is magnetized in a direction at an angle in a range from about 5° to about 10° with respect to the −Z direction. Accordingly, in the magnet 10, the S pole of the first magnetized region 11 and the N pole of the second magnetized region 12 may be adjacent to each other in the X-axis direction, and the N pole of the first magnetized region 11 and the S pole of the second magnetized region 12 may be adjacent to each other in the X-axis direction. The first magnetized region 11 and the second magnetized region 12 may be in contact with each other. Alternatively, the magnet 10 may include a neutral zone between the first magnetized region 11 and the second magnetized region 12 in the X-axis direction. The neutral zone refers to an unmagnetized region, i.e., a region that is not magnetized. A shape, a size, a weight, and a magnetic volume of the first magnetized region 11 may be the same as a shape, a size, a weight, and a magnetic volume of the second magnetized region 12, respectively. However, one or more of the shape, the size, the weight, or the magnetic volume of the first magnetized region 11 may be different from corresponding one or more of the shape, the size, the weight, or the magnetic volume of the second magnetized region 12.

[Driving Coil 20]

The driving coil 20 may be a thin-film coil spirally wound in a plane parallel to an XY plane orthogonal to the Z-axis direction, for example. In some embodiments, the driving coil 20 may be provided on a printed board. In some embodiments, the driving coil 20 may be provided in a printed board. In FIGS. 1A and 1C, an entire shape of the driving coil 20 is illustrated in a simplified manner. The number of turns of the driving coil 20 may be set to a desired number and is not limited to the number of turns illustrated in FIG. 1B. The driving coil 20 may generate a second magnetic field MF2, as illustrated in FIG. 1B, by being supplied with a current. The magnet 10 may move in the X-axis direction parallel to the XY plane by being subjected to the second magnetic field MF2.

The driving coil 20 is spaced from and overlaps a part of the magnet 10 in the Z-axis direction, and extends across the part of the magnet 10 in the Y-axis direction. In one example, the driving coil 20 may include a first part 21 and a second part 22 each extending in the Y-axis direction. The first part 21 may be spaced from and overlap the first magnetized region 11 in the Z-axis direction, and the second part 22 may be spaced from and overlap the second magnetized region 12 in the Z-axis direction. For example, a current may be supplied to the first part 21 of the driving coil 20 in a +Y direction, and to the second part 22 of the driving coil 20 in a −Y direction. Accordingly, the second magnetic field MF2 generated by the first part 21 and exerted on the first magnetized region 11 may be in a +X direction, and the second magnetic field MF2 generated by the second part 22 and exerted on the second magnetized region 12 may be in a −X direction. In other words, the direction of the second magnetic field MF2 exerted on the first magnetized region 11 may be opposite to the direction of the second magnetic field MF2 exerted on the second magnetized region 12.

[Magnetic Field Sensor 30]

The magnetic field sensor 30 detects a magnetic field component, of the first magnetic field MF1 applied to the magnetic field sensor 30, that is parallel to the XY plane. The magnetic field sensor 30 may generate a detection signal corresponding to the direction and magnitude of the first magnetic field MF1. An output signal from the magnetic field sensor 30 may change in response to a change in position of the magnet 10 between a first position P1 and a second position P2 both inclusive. For example, the magnetic field sensor 30 may exhibit a resistance value corresponding to a relative position of the magnet 10 with respect to the magnetic field sensor 30 in the X-axis direction. This makes it possible for the magnetic field sensor 30 to detect the position of the magnet 10 in the X-axis direction between the first position P1 and the second position P2 both inclusive. As illustrated in FIG. 1C, the magnetic field sensor 30 may be disposed, for example, outside the driving coil 20 in a plan view as viewed in the Z-axis direction. Further, all or a part of the magnetic field sensor 30 and all or a part of the driving coil 20 may overlap each other in the Y-axis direction. For example, the magnetic field sensor 30 may be provided at the same level at which the driving coil 20 is provided. Further, a center position CY30 of the magnetic field sensor 30 in the Y-axis direction is different from a center position CY10 of the magnet 10 in the Y-axis direction.

Figure 2A:
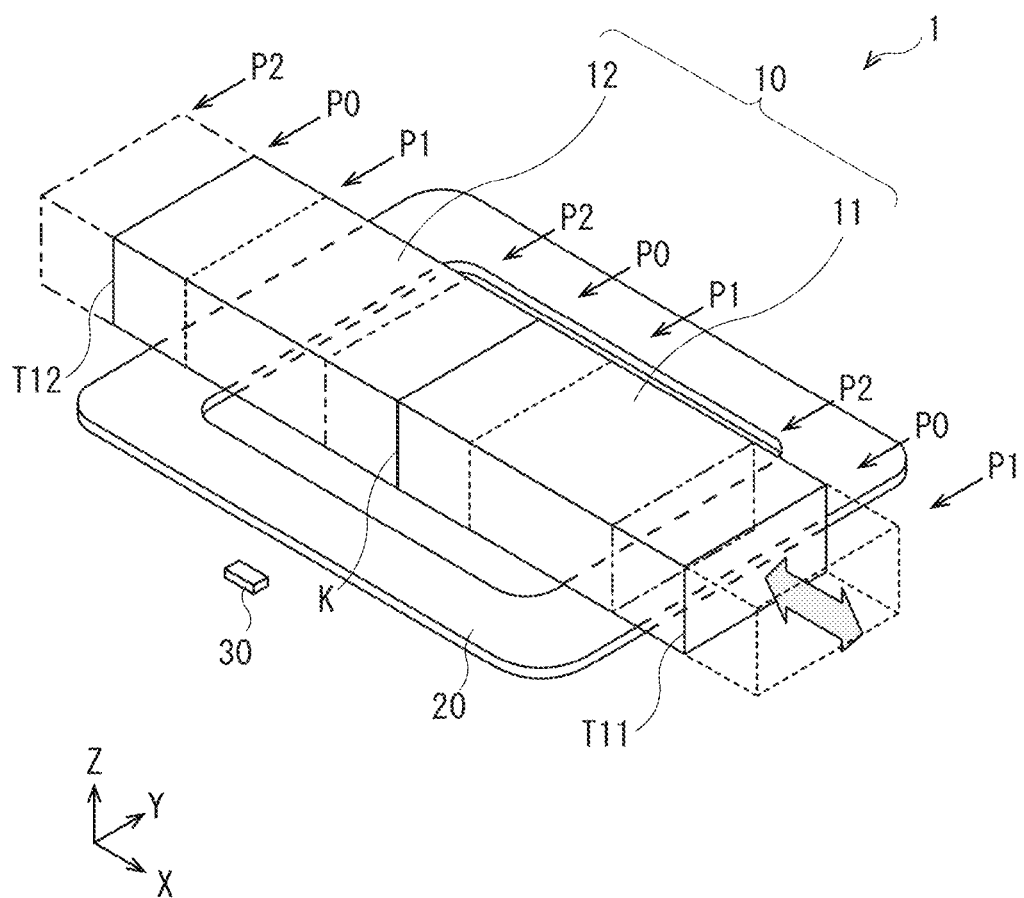
FIG. 2A is a perspective diagram describing a behavior of a magnet in the position detection device illustrated in FIG. 1A.
Figure 2B:
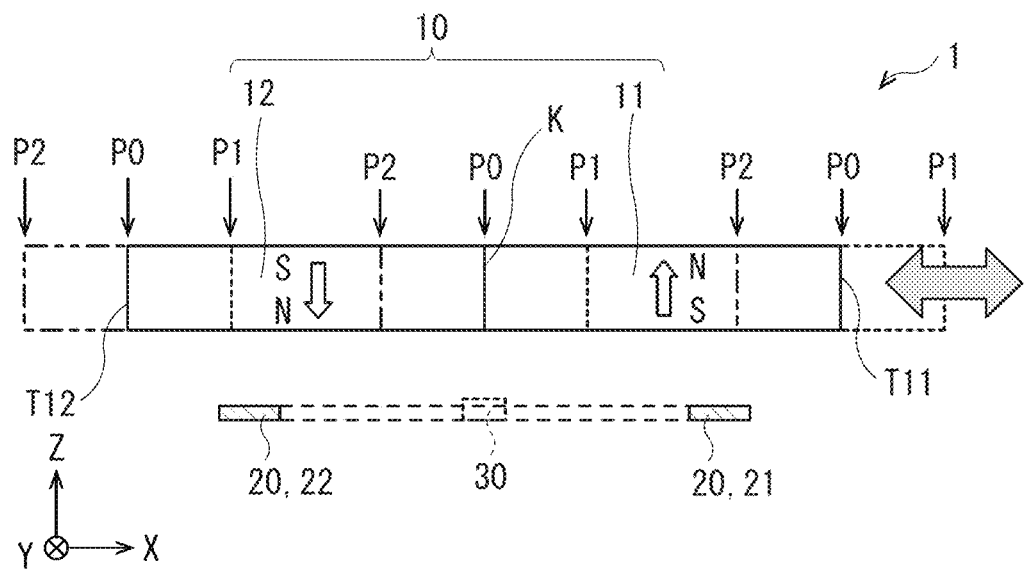
FIG. 2B is a cross-sectional diagram describing the behavior of the magnet in the position detection device illustrated in FIG. 1A.
Figure 2C:
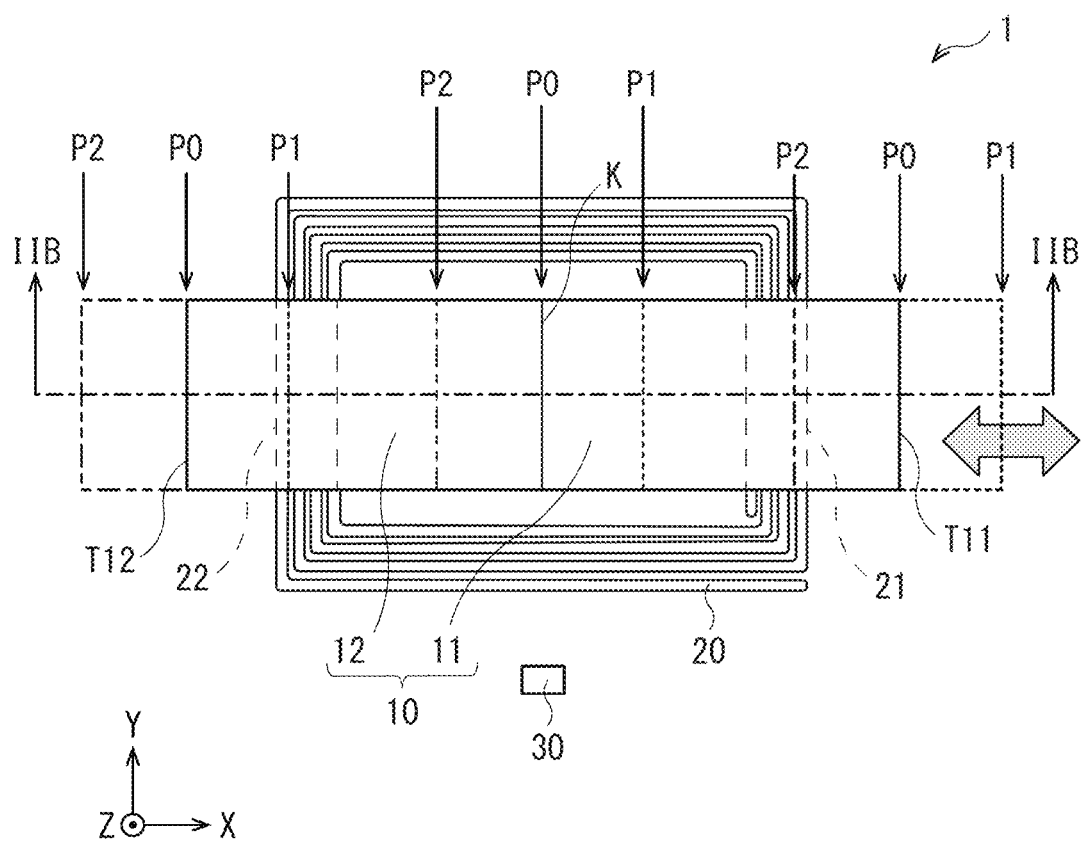
FIG. 2C is a plan diagram describing the behavior of the magnet in the position detection device illustrated in FIG. 1A.

FIGS. 2A to 2C each illustrate a behavior of the magnet 10 in the position detection device 1, and respectively correspond to FIGS. 1A to 1C. Application of the second magnetic field MF2, i.e., an induction magnetic field generated by the driving coil 20, to the magnet 10 allows for movement of the magnet 10 in the +X direction from an initial position P0 to the first position P1 and in the −X direction from the initial position P0 to the second position P2, as illustrated in FIGS. 2A to 2C. For example, an edge T11 of the first magnetized region 11, an edge T12 of the second magnetized region 12, and a border K between the first magnetized region 11 and the second magnetized region 12 in the magnet 10 may each be movable in the X-axis direction between the first position P1 and the second position P2 both inclusive. Here, the magnet 10 may be movable in both the +X direction and the −X direction between the first position P1 and the second position P2 both inclusive, while remaining in a state of overlapping the part of the driving coil 20 in the Z-axis direction. In one example, in the position detection device 1, the magnet 10 may be movable to the extent that the first part 21 does not protrude relative to the first magnetized region 11 in the X-axis direction and that the second part 22 does not protrude relative to the second magnetized region 12 in the X-axis direction. Note that a current fed through the driving coil 20 when moving the magnet 10 in the +X direction with respect to the driving coil 20 and the magnetic field sensor 30 and a current fed through the driving coil 20 when moving the magnet 10 in the −X direction with respect to the driving coil 20 and the magnetic field sensor 30 may be in directions opposite to each other.

Figure 3:
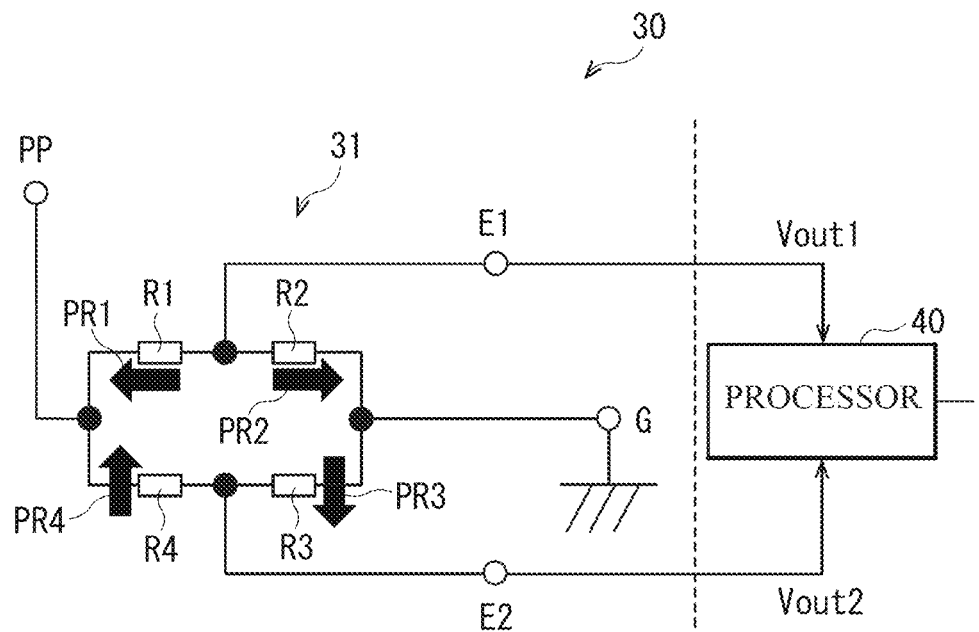
FIG. 3 is a circuit diagram illustrating a circuit configuration example of a magnetic field sensor in the position detection device illustrated in FIG. 1A.

A configuration of the magnetic field sensor 30 will now be described with reference to FIG. 3. FIG. 3 is a circuit diagram illustrating a configuration example of the magnetic field sensor 30. In the present example embodiment, the magnetic field sensor 30 may be configured to generate, as a detection signal corresponding to the direction of the first magnetic field MF1 that is a magnetic field to be detected, a detection signal corresponding to an angle that the direction of the first magnetic field MF1 forms with respect to a reference direction.

As illustrated in FIG. 3, the magnetic field sensor 30 may include a Wheatstone bridge circuit 31. The Wheatstone bridge circuit 31 may include a power supply port PP, a ground port G, two output ports E1 and E2, a first resistor R1 and a second resistor R2 coupled in series to each other, and a third resistor R3 and a fourth resistor R4 coupled in series to each other. The first resistor R1 and the fourth resistor R4 may each have a first end coupled to the power supply port PP. The first resistor R1 may have a second end coupled to a first end of the second resistor R2 and the output port E1. The fourth resistor R4 may have a second end coupled to a first end of the third resistor R3 and the output port E2. The second resistor R2 and the third resistor R3 may each have a second end coupled to the ground port G. A power supply voltage of a predetermined magnitude may be applied to the power supply port PP. The ground port G may be coupled to a ground. The output ports E1 and E2 may each be coupled to a processor 40 provided outside.

In the present example embodiment, the first to fourth resistors R1 to R4 may each include a plurality of magnetoresistive effect (MR) elements. The MR elements may be coupled in series. The MR elements may each be a spin-valve MR element, for example. The spin-valve MR element may include a magnetization pinned layer having a magnetization pinned in a certain direction, a free layer that is a magnetic layer having a magnetization whose direction changes in accordance with the direction of a magnetic field to be detected, and a nonmagnetic layer disposed between the magnetization pinned layer and the free layer. The spin-valve MR element may be a tunneling magnetoresistive effect (TMR) element or a giant magnetoresistive effect (GMR) element. In the TMR element, the nonmagnetic layer is a tunnel barrier layer. In the GMR element, the nonmagnetic layer is a nonmagnetic electrically-conductive layer. The spin-valve MR element changes in resistance in accordance with an angle that the direction of magnetization of the free layer forms with respect to the direction of magnetization of the magnetization pinned layer. The resistance of the spin-valve MR element is at a minimum value when the above-described angle is 0°, and at a maximum value when the above-described angle is 180°.

Figure 4:
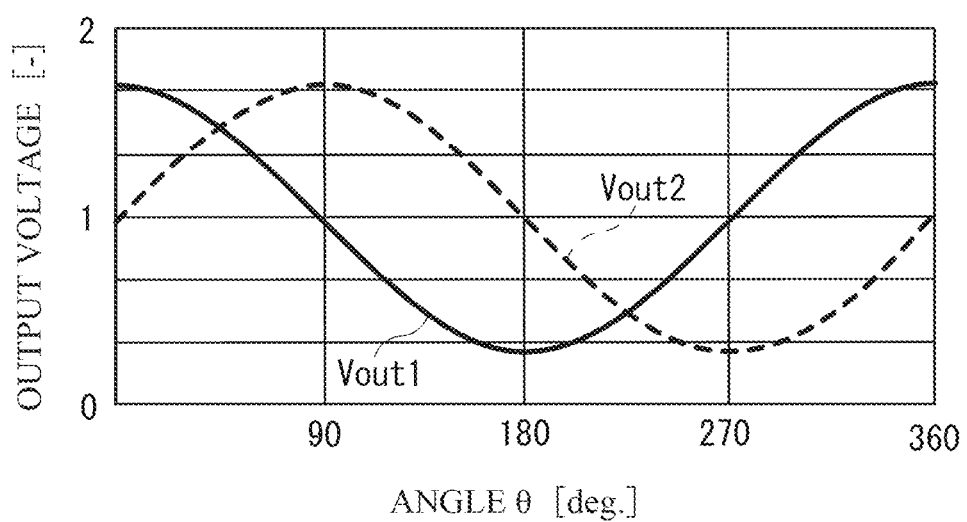
FIG. 4 is a characteristic diagram illustrating an output voltage characteristic obtainable from the magnetic field sensor having the example circuit configuration illustrated in FIG. 3.

Hereinafter, the direction of magnetization of the magnetization pinned layers of the MR elements included in the first resistor R1 will be simply referred to as a pinned direction PR1 of the first resistor R1, and the direction of magnetization of the magnetization pinned layers of the MR elements included in the second resistor R2 will be simply referred to as a pinned direction PR2 of the second resistor R2. Further, the direction of magnetization of the magnetization pinned layers of the MR elements included in the third resistor R3 will be simply referred to as a pinned direction PR3 of the third resistor R3, and the direction of magnetization of the magnetization pinned layers of the MR elements included in the fourth resistor R4 will be simply referred to as a pinned direction PR4 of the fourth resistor R4. As illustrated in FIG. 3, the pinned direction PR1 of the first resistor R1 and the pinned direction PR2 of the second resistor R2 are opposite to each other. The pinned direction PR3 of the third resistor R3 and the pinned direction PR4 of the fourth resistor R4 are opposite to each other. Further, the pinned direction PR1 of the first resistor R1 and the pinned direction PR2 of the second resistor R2 are orthogonal to the pinned direction PR3 of the third resistor R3 and the pinned direction PR4 of the fourth resistor R4. Therefore, as illustrated in FIG. 4, for example, when a voltage Vout1 outputted to the output port E1 changes in a cosinusoidal manner in accordance with an angle θ that the direction of the first magnetic field MF1 forms with respect to the reference direction, a voltage Vout2 outputted to the output port E2 changes in a sinusoidal manner in accordance with the angle θ. In other words, the voltage Vout1 and the voltage Vout2 have a phase difference of 90° from each other in relation to the angle θ. The detection signal depends on a potential at the output port E1, a potential at the output port E2, and a potential difference between the output ports E1 and E2. The detection signal changes in accordance with the direction of the first magnetic field MF1 that is the magnetic field to be detected. FIG. 4 is a characteristic diagram illustrating an example of an output voltage characteristic obtainable from the magnetic field sensor 30.

Considering, for example, the degree of accuracy of fabrication of the MR elements, the direction of magnetization of each of the magnetization pinned layers in the MR elements may slightly differ from corresponding one of the above-described directions. For example, the pinned direction PR2 of the second resistor R2 may form an angle of 180°±about 15° with respect to the pinned direction PR1 of the first resistor R1, and the pinned direction PR4 of the fourth resistor R4 may form an angle of 180°±about 15° with respect to the pinned direction PR3 of the third resistor R3. Further, the pinned direction PR3 of the third resistor R3 and the pinned direction PR4 of the fourth resistor R4 may each form an angle of 90°±about 15° with respect to the pinned direction PR1 of the first resistor R1, and also with respect to the pinned direction PR2 of the second resistor R2.

Figure 5:
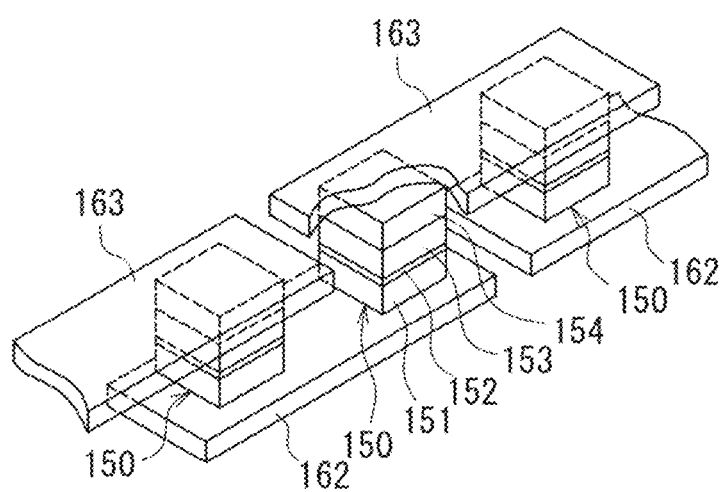
FIG. 5 is a partial perspective view of a resistor in FIG. 3.

An example configuration of the first to fourth resistors R1 and R4 will now be described with reference to FIG. 5. FIG. 5 is a partial perspective view of one resistor in the magnetic field sensor 30 illustrated in FIG. 3. In this example, the resistor may include a plurality of lower electrodes 162, a plurality of magnetoresistive effect (MR) elements 150, and a plurality of upper electrodes 163. The MR elements 150 may each serve as a magnetic detection element. The lower electrodes 162 may be disposed on a substrate. The lower electrodes 162 may each have a long slender shape. Every two lower electrodes 162 adjacent to each other in a longitudinal direction of the lower electrodes 162 may have a gap therebetween. As illustrated in FIG. 5, two MR elements 150 may be disposed on the top surface of each lower electrode 162 at positions near opposite ends in the longitudinal direction of the lower electrode 162. The MR elements 150 may each include, for example, a magnetization free layer 151, a nonmagnetic layer 152, a magnetization pinned layer 153, and an antiferromagnetic layer 154 that are staked in this order from the lower electrode 162 side. The magnetization free layer 151 may be electrically coupled to the lower electrode 162. The antiferromagnetic layer 154 may include an antiferromagnetic material, and may be exchange-coupled to the magnetization pinned layer 153 to thereby pin the direction of magnetization of the magnetization pinned layer 153. The upper electrodes 163 may be disposed on the MR elements 150. The upper electrodes 163 may each have a long slender shape, and may electrically couple the respective antiferromagnetic layers 154 of two adjacent MR elements 150 that are disposed on two lower electrodes 162 adjacent to each other in the longitudinal direction of the lower electrodes 162. With such a configuration, the resistor illustrated in FIG. 5 may include the MR elements 150 coupled in series to each other by the lower electrodes 162 and the upper electrodes 163. Note that the magnetization free layer 151, the nonmagnetic layer 152, the magnetization pinned layer 153, and the antiferromagnetic layer 154 in the MR element 150 may be stacked in an order reverse to the order of stacking illustrated in FIG. 5.

[Example Workings and Example Effects of Position Detection Device 1]

A description will now be given of example workings and example effects of the position detection device 1 according to the present example embodiment. The position detection device 1 according to the present example embodiment includes the magnet 10, the driving coil 20, and the magnetic field sensor 30. The magnet 10 generates the first magnetic field MF1. The driving coil 20 is opposed to the magnet 10 in the Z-axis direction and generates the second magnetic field MF2 to thereby cause the magnet 10 to move in the X-axis direction. The magnetic field sensor 30 detects a magnetic field component, of the first magnetic field MF1, that is parallel to the XY plane. Here, the magnet 10 is movable in the X-axis direction with respect to the driving coil 20 and the magnetic field sensor 30. The center position CY30 of the magnetic field sensor 30 in the Y-axis direction is different from the center position CY10 of the magnet 10 in the Y-axis direction. The magnetic field sensor 30 is to detect the magnetic field component parallel to the XY plane, and is therefore unaffected by a magnetic field component in the Z-axis direction generated from the driving coil 20. Further, relative positions of the magnetic field sensor 30 and the driving coil 20 are fixed with respect to each other while the position of the magnet 10 changes with respect to the position of the magnetic field sensor 30. This allows the direction of the second magnetic field MF2 with respect to the magnetic field sensor 30 to remain unchanged. Furthermore, the first part 21 and the second part 22 of the driving coil 20 are respectively spaced from and overlap the first magnetized region 11 and the second magnetized region 12 of the magnet 10, and respectively extend across the first magnetized region 11 and the second magnetized region 12 of the magnet 10 in the Y-axis direction. Accordingly, the second magnetic field MF2 generated by the driving coil 20 is efficiently and stably applied to the first magnetized region 11 and the second magnetized region 12 of the magnet 10. This allows the magnet 10 to be accurately movable even if the second magnetic field MF2 is very small, and allows the magnetic field sensor 30 to accurately detect a change in the first magnetic field MF1 generated by the magnet 10.

2. Second Example Embodiment

[Configuration of Position Detection Device 2]

A configuration of a position detection device 2 according to a second example embodiment of the disclosure will now be described with reference to FIGS. 6A to 6C.

Figure 6A:
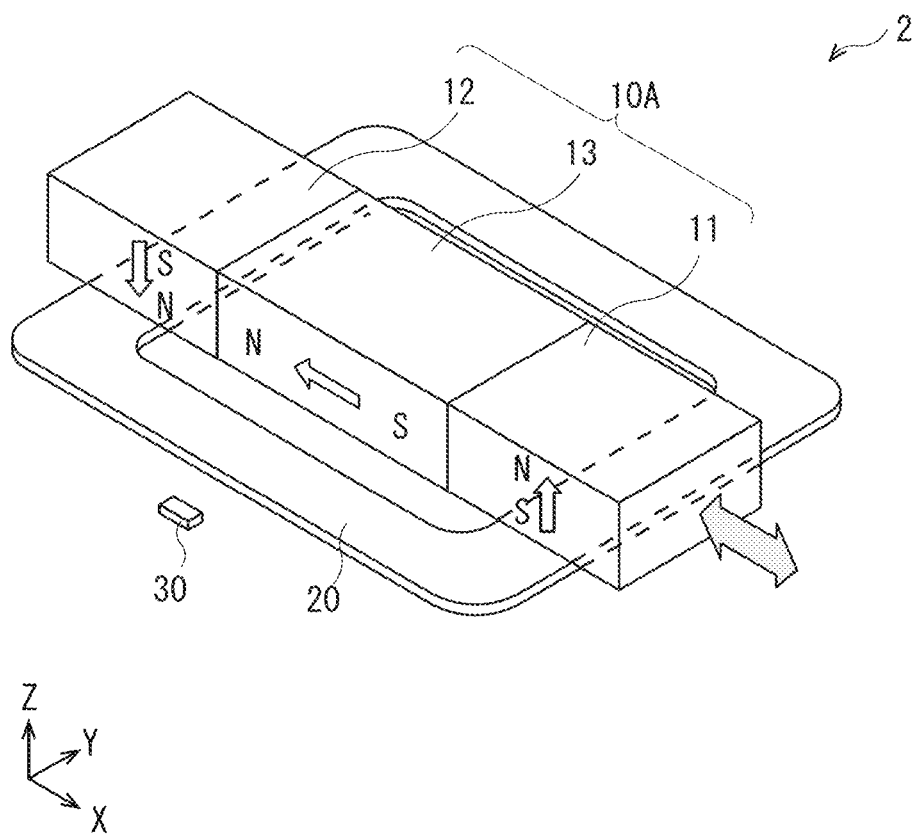
FIG. 6A is a perspective diagram illustrating a configuration example of a position detection device according to one example embodiment of the disclosure.

FIG. 6A is a perspective diagram illustrating an overall configuration example of the position detection device 2. FIG. 6B is a cross-sectional diagram illustrating a cross-sectional configuration example of the position detection device 2. FIG. 6C is a plan view of the position detection device 2 as viewed from above. Note that FIG. 6B illustrates a cross section as viewed in an arrowed direction along line VIB-VIB in FIG. 6C. FIGS. 6A, 6B, and 6C respectively correspond to FIGS. 1A, 2B, and 2C illustrating the position detection device 1 according to the foregoing first example embodiment.

Figure 6B:
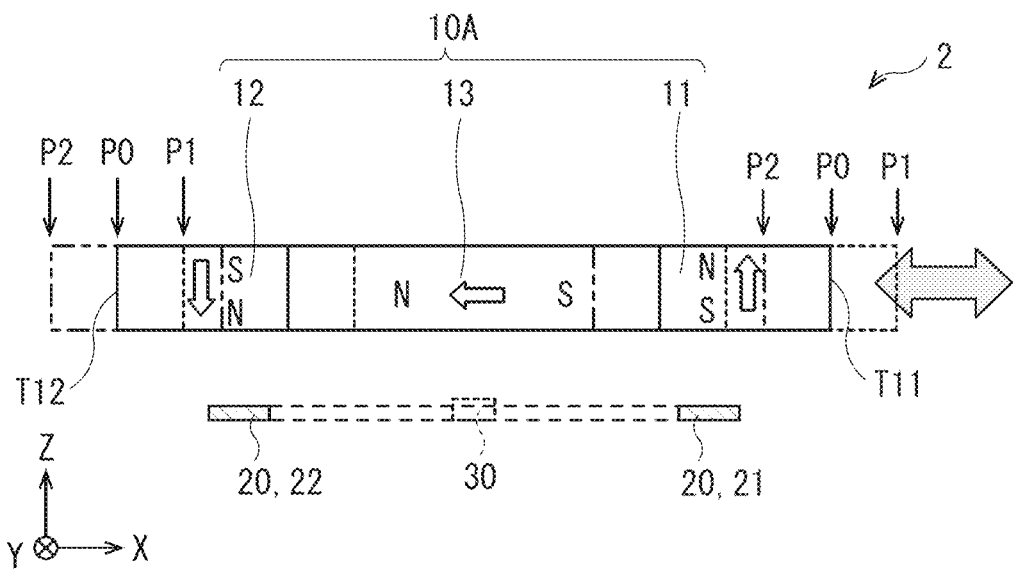
FIG. 6B is a cross-sectional diagram illustrating a cross-sectional configuration example of the position detection device illustrated in FIG. 6A.
Figure 6C:
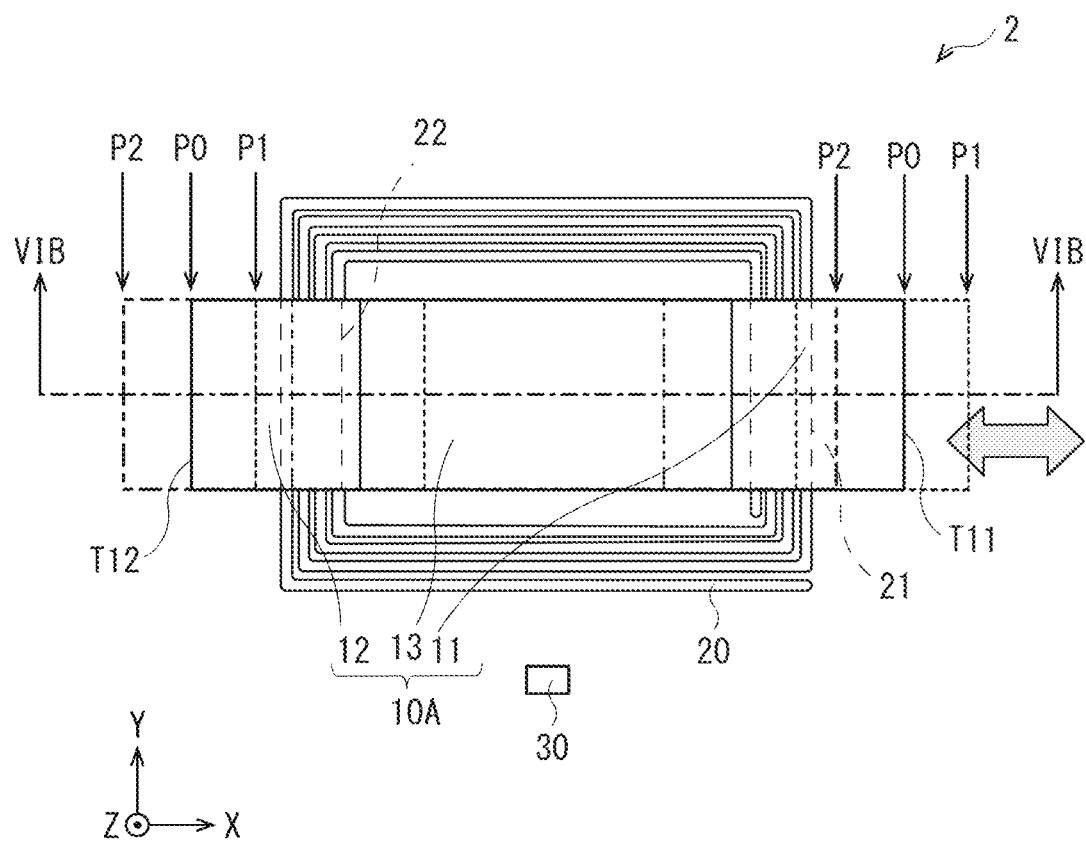
FIG. 6C is a plan view of the position detection device illustrated in FIG. 6A as viewed from above.

As illustrated in FIGS. 6A to 6C, the position detection device 2 may include a magnet 10A instead of the magnet 10. In the magnet 10A of the position detection device 2, the first magnetized region 11 and the second magnetized region 12 arranged in the X-axis direction may be at a distance from each other. The magnet 10A may further include a third magnetized region 13 between the first magnetized region 11 and the second magnetized region 12. The third magnetized region 13 may be magnetized, for example, in the −X direction along the X-axis direction. The position detection device 2 may be otherwise substantially the same in configuration as the position detection device 1 according to the foregoing first example embodiment. Note that the third magnetized region 13 may be in contact with each of the first magnetized region 11 and the second magnetized region 12. Alternatively, an unmagnetized region may be present between the first magnetized region 11 and the third magnetized region 13, and between the second magnetized region 12 and the third magnetized region 13.

In the position detection device 2 also, application of the second magnetic field MF2 to the magnet 10A allows for movement of the magnet 10A in the ±X direction from the initial position P0 to the first position P1 and in the −X direction from the initial position P0 to the second position P2, as illustrated in FIGS. 6B and 6C. For example, the edge T11 of the first magnetized region 11 and the edge T12 of the second magnetized region 12 in the magnet 10A may each be movable in the X-axis direction between the first position P1 and the second position P2 both inclusive. Here, the magnet 10A may be movable in both the ±X direction and the −X direction between the first position P1 and the second position P2 both inclusive, while remaining in the state of overlapping the part of the driving coil 20 in the Z-axis direction. In one example, in the position detection device 2, the magnet 10A may be movable in the X-axis direction to the extent that the first part 21 does not protrude relative to the first magnetized region 11 in the X-axis direction and that the second part 22 does not protrude relative to the second magnetized region 12 in the X-axis direction. In the position detection device 2, however, the third magnetized region 13 may be provided between the first magnetized region 11 and the second magnetized region 12 as described above, and the magnet 10A may thus be so movable in the X-axis direction as to allow the first part 21 to protrude relative to the first magnetized region 11 in the X-axis direction and allow the second part 22 to protrude relative to the second magnetized region 12 in the X-axis direction.

[Example Workings and Example Effects of Position Detection Device 2]

In the position detection device 2 according to the present example embodiment, the magnet 10A may include the third magnetized region 13. This helps to achieve improved linearity of output versus changes in the first magnetic field MF1, as compared with that achievable with the position detection device 1 according to the foregoing first example embodiment. Further, in a region where the magnet 10A is movable by a relatively large amount in the X-axis direction, it is possible to increase the strength of the first magnetic field MF1 applied to the magnetic field sensor 30. This helps to improve detection accuracy.

Figure 7:
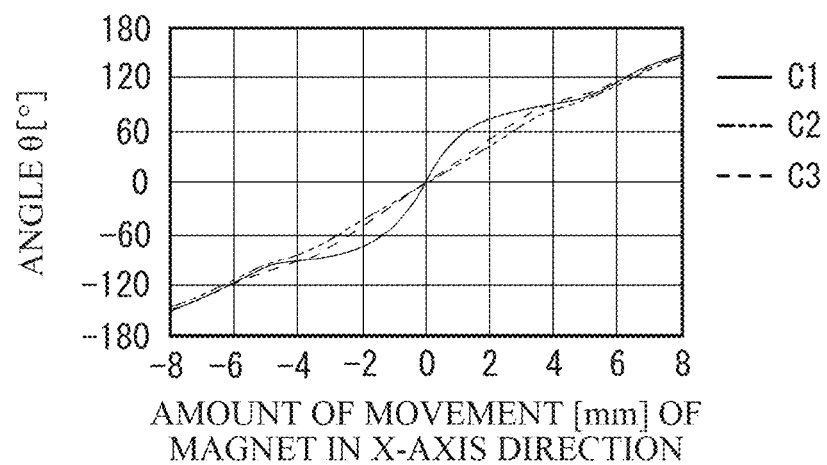
FIG. 7 is a characteristic diagram schematically illustrating an example of a relationship between an amount of movement of the magnet in an X-axis direction and an angle formed by a direction of a first magnetic field detected by the magnetic field sensor.

FIG. 7 is a characteristic diagram schematically illustrating an example of a relationship between the amount of movement of the first magnetic field generator, i.e., the magnet 10A, in the X-axis direction and the angle θ of the direction of the first magnetic field MF1 detectable by the magnetic field sensor 30. In FIG. 7, the horizontal axis represents the amount of movement of the first magnetic field generator in the X-axis direction from a reference position, and the vertical axis represents the angle θ of the direction of the first magnetic field MF1 detectable by the magnetic field sensor 30. For comparison, FIG. 7 also illustrates a similar characteristic of the position detection device 1 according to the foregoing first example embodiment. FIG. 7 also illustrates a similar characteristic of a position detection device 3 according to a third example embodiment to be described later. In FIG. 7, a curve C1 represents the characteristic of the position detection device 1, a curve C2 represents the characteristic of the position detection device 2, and a curve C3 represents the characteristic of the position detection device 3. As seen from FIG. 7, the position detection devices 2 and 3 each exhibit a more linear change in the angle θ of the direction of the first magnetic field MF1 versus the amount of movement of the first magnetic field generator in the X-axis direction, as compared with the position detection device 1. Accordingly, it is possible for the position detection device 2 to detect the amount of movement of the magnet 10A in the X-axis direction with higher accuracy than the position detection device 1.

Figure 8:
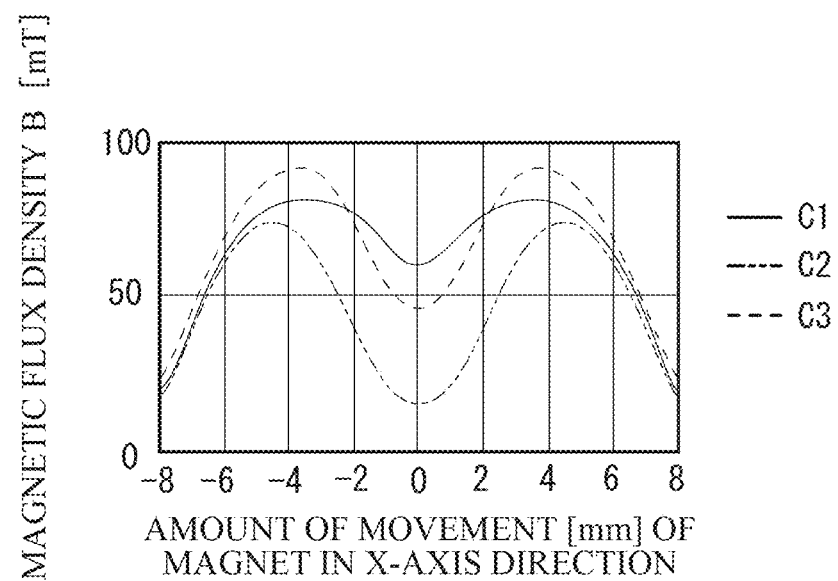
FIG. 8 is a characteristic diagram schematically illustrating an example of a relationship between the amount of movement of the magnet in the X-axis direction and a magnetic flux density of the first magnetic field applied to the magnetic field sensor.

FIG. 8 is a characteristic diagram schematically illustrating an example of a relationship between the amount of movement of the first magnetic field generator, i.e., the magnet 10A, in the X-axis direction and a magnetic flux density B of the first magnetic field MF1 to be applied to the magnetic field sensor 30. In FIG. 8, the horizontal axis represents the amount of movement of the first magnetic field generator in the X-axis direction from the reference position, and the vertical axis represents the magnetic flux density B of the first magnetic field MF1 to be applied to the magnetic field sensor 30. For comparison, FIG. 8 also illustrates a similar characteristic of the position detection device 1 according to the foregoing first example embodiment. FIG. 8 also illustrates a similar characteristic of the position detection device 3 according to the third example embodiment to be described later. In FIG. 8, a curve C1 represents the characteristic of the position detection device 1, a curve C2 represents the characteristic of the position detection device 2, and a curve C3 represents the characteristic of the position detection device 3. As seen from FIG. 8, in a region where the amount of movement of the first magnetic field generator or the magnet 10A is small, the position detection device 2 exhibits a lower magnetic flux density as compared with the position detection device 1, whereas in a region where the amount of movement of the first magnetic field generator or the magnet 10A is large to some extent, the position detection device 2 exhibits a higher magnetic flux density as compared with the position detection device 1.

3. Third Example Embodiment

[Configuration of Position Detection Device 3]

A configuration of the position detection device 3 according to the third example embodiment of the disclosure will now be described with reference to FIGS. 9A to 9C.

Figure 9A:
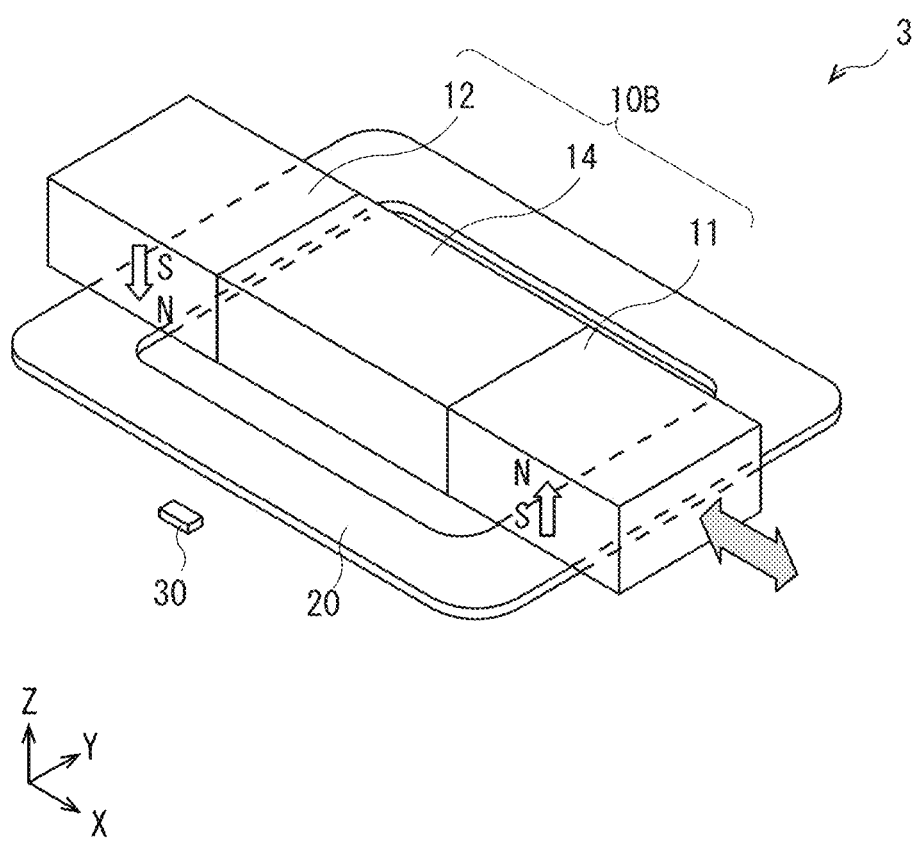
FIG. 9A is a perspective diagram illustrating a configuration example of a position detection device according to one example embodiment of the disclosure.

FIG. 9A is a perspective diagram illustrating an overall configuration example of the position detection device 3. FIG. 9B is a cross-sectional diagram illustrating a cross-sectional configuration example of the position detection device 3. FIG. 9C is a plan view of the position detection device 3 as viewed from above. Note that FIG. 9B illustrates a cross section as viewed in an arrowed direction along line IXB-IXB in FIG. 9C. FIGS. 9A, 9B, and 9C respectively correspond to FIGS. 1A, 2B, and 2C illustrating the position detection device 1 according to the foregoing first example embodiment.

Figure 9B:
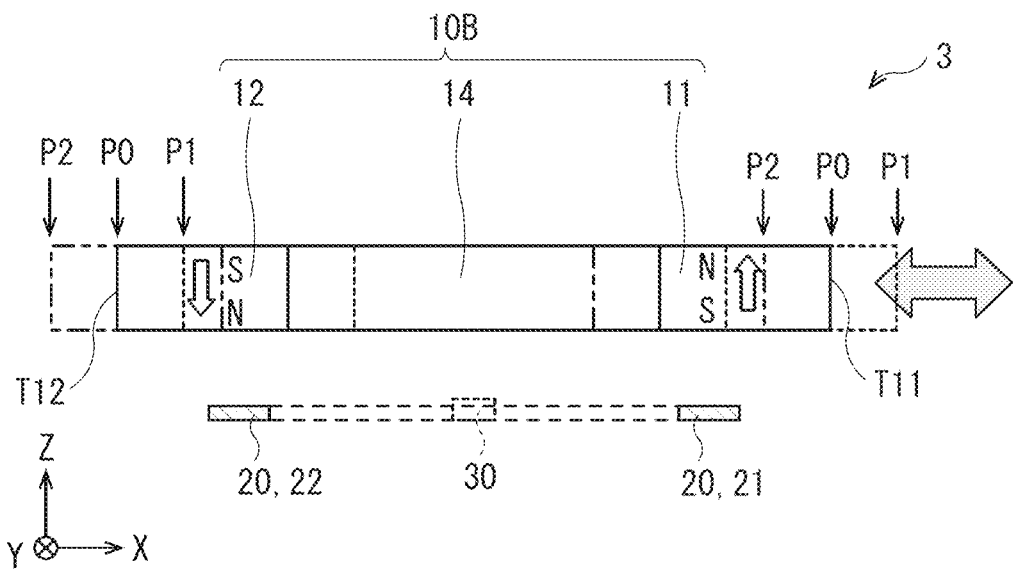
FIG. 9B is a cross-sectional diagram illustrating a cross-sectional configuration example of the position detection device illustrated in FIG. 9A.
Figure 9C:
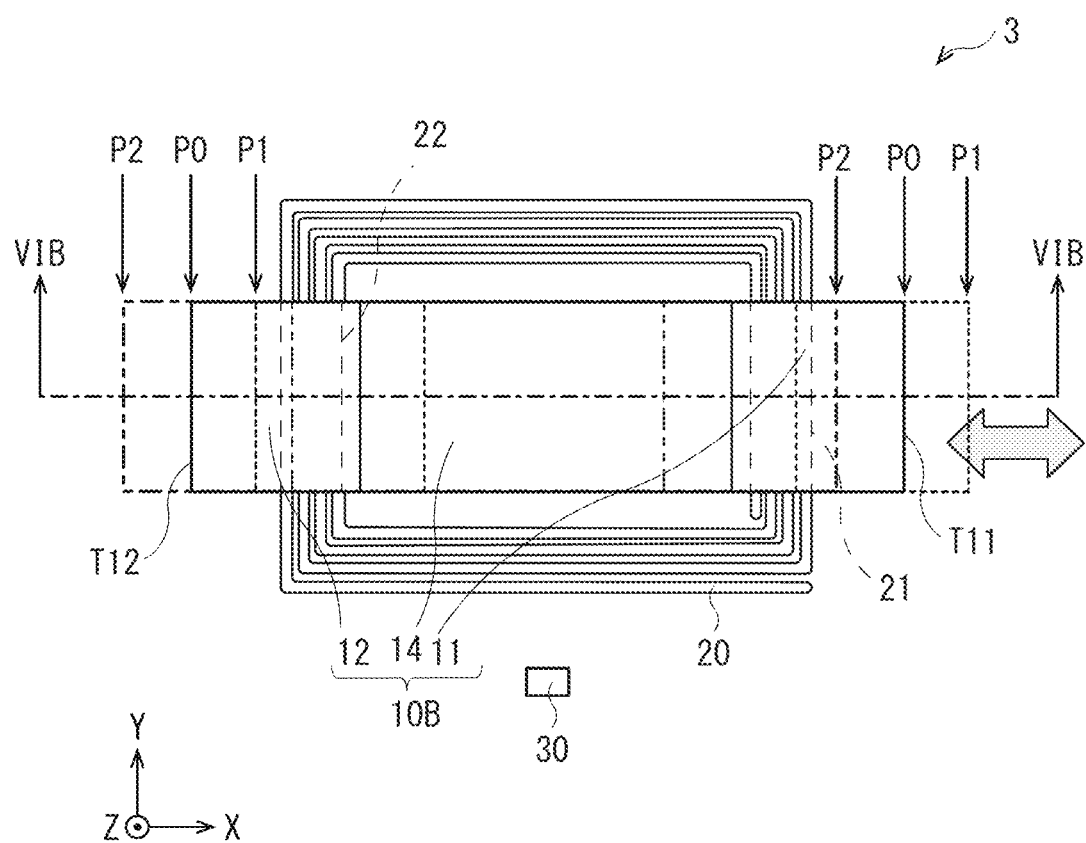
FIG. 9C is a plan view of the position detection device illustrated in FIG. 9A as viewed from above.

As illustrated in FIGS. 9A to 9C, the position detection device 3 may include a magnet 10B instead of the magnet 10. In the magnet 10B of the position detection device 3, the first magnetized region 11 and the second magnetized region 12 arranged in the X-axis direction may be at a distance from each other. The magnet 10B may further include an unmagnetized region 14 between the first magnetized region 11 and the second magnetized region 12. The position detection device 3 may be otherwise substantially the same in configuration as the position detection device 1 according to the foregoing first example embodiment.

In the position detection device 3 also, application of the second magnetic field MF2 to the magnet 10B allows for movement of the magnet 10B in the ±X direction from the initial position P0 to the first position P1 and in the −X direction from the initial position P0 to the second position P2, as illustrated in FIGS. 9B and 9C. For example, the edge T11 of the first magnetized region 11 and the edge T12 of the second magnetized region 12 in the magnet 10B may each be movable in the X-axis direction between the first position P1 and the second position P2 both inclusive. Here, the magnet 10B may be movable in both the ±X direction and the −X direction between the first position P1 and the second position P2 both inclusive, while remaining in the state of overlapping the part of the driving coil 20 in the Z-axis direction. In one example, in the position detection device 3, the magnet 10B may be movable to the extent that the first part 21 does not protrude relative to the first magnetized region 11 in the X-axis direction and that the second part 22 does not protrude relative to the second magnetized region 12 in the X-axis direction.

[Example Workings and Example Effects of Position Detection Device 3]

In the position detection device 3 according to the present example embodiment, the magnet 10B may include the unmagnetized region 14. This helps to achieve improved linearity of output versus changes in the first magnetic field MF1, as compared with that achievable with the position detection device 1. Accordingly, it is possible for the position detection device 3 to detect the amount of movement of the magnet 10B in the X-axis direction with higher accuracy than the position detection device 1.

4. Fourth Example Embodiment

[Configuration of Position Detection Device 4]

A configuration of a position detection device 4 according to a fourth example embodiment of the disclosure will now be described with reference to FIGS. 10A and 10B.

Figure 10A:
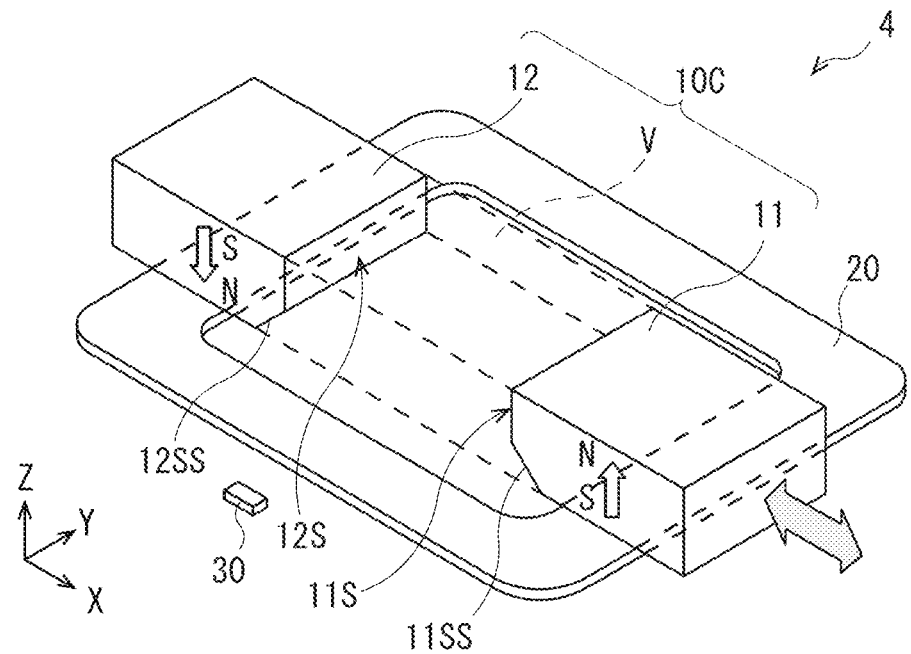
FIG. 10A is a perspective diagram illustrating a configuration example of a position detection device according to one example embodiment of the disclosure.

FIG. 10A is a perspective diagram illustrating an overall configuration example of the position detection device 4. FIG. 10B is a cross-sectional diagram illustrating a cross-sectional configuration example of the position detection device 4. FIGS. 10A and 10B respectively correspond to FIGS. 1A and 2B illustrating the position detection device 1 according to the foregoing first example embodiment.

Figure 10B:
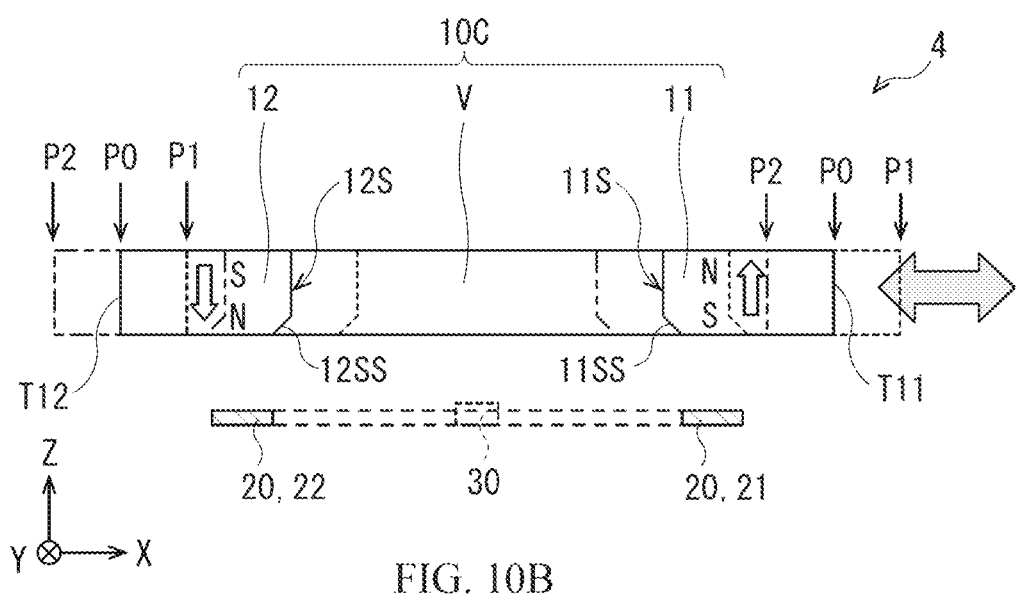
FIG. 10B is a cross-sectional diagram illustrating a cross-sectional configuration example of the position detection device illustrated in FIG. 10A.

As illustrated in FIGS. 10A and 10B, the position detection device 4 may include a magnet 10C instead of the magnet 10. In the magnet 10C of the position detection device 4, the first magnetized region 11 and the second magnetized region 12 arranged in the X-axis direction may be at a distance from each other. The magnet 10C may have a space V between the first magnetized region 11 and the second magnetized region 12. Further, the first magnetized region 11 may include an opposed surface 11S opposed to the second magnetized region 12. A part of the opposed surface 11S may be chamfered into an inclined surface 11SS. Similarly, the second magnetized region 12 may include an opposed surface 12S opposed to the first magnetized region 11. A part of the opposed surface 12S may be chamfered into an inclined surface 12SS. The inclined surface 11SS and the inclined surface 12SS may extend in parallel to the Y-axis direction and be inclined with respect to the XY plane. The position detection device 4 may be otherwise substantially the same in configuration as the position detection device 1 according to the foregoing first example embodiment. Note that all of the opposed surface 11S may constitute the inclined surface 11SS, and all of the opposed surface 12S may constitute the inclined surface 12SS.

In the position detection device 4 also, application of the second magnetic field MF2 to the magnet 10C allows for movement of the magnet 10C in the ±X direction from the initial position P0 to the first position P1 and in the −X direction from the initial position P0 to the second position P2, as illustrated in FIG. 10B. For example, the edge T11 of the first magnetized region 11 and the edge T12 of the second magnetized region 12 in the magnet 10C may each be movable in the X-axis direction between the first position P1 and the second position P2 both inclusive. Here, the magnet 10C may be movable in both the ±X direction and the −X direction between the first position P1 and the second position P2 both inclusive, while remaining in the state of overlapping the part of the driving coil 20 in the Z-axis direction. In one example, in the position detection device 4, the magnet 10C may be movable to the extent that the first part 21 does not protrude relative to the first magnetized region 11 in the X-axis direction and that the second part 22 does not protrude relative to the second magnetized region 12 in the X-axis direction.

[Example Workings and Example Effects of Position Detection Device 4]

In the position detection device 4 according to the present example embodiment, the first magnetized region 11 and the second magnetized region 12 may be at a distance from each other. In addition, the first magnetized region 11 and the first part 21 may overlap each other in the Z-axis direction, and the second magnetized region 12 and the second part 22 may overlap each other in the Z-axis direction. Moreover, a part of the opposed surface 11S may constitute the inclined surface 11SS, and a part of the opposed surface 12S may constitute the inclined surface 12SS. Accordingly, the position detection device 4 allows for improved linearity of output versus changes in the first magnetic field MF1, as compared with the position detection device 1 and the position detection device 3. Accordingly, it is possible for the position detection device 4 to detect the amount of movement of the magnet 10C in the X-axis direction with higher accuracy.

Modification Example of Fourth Example Embodiment

Figure 11A:
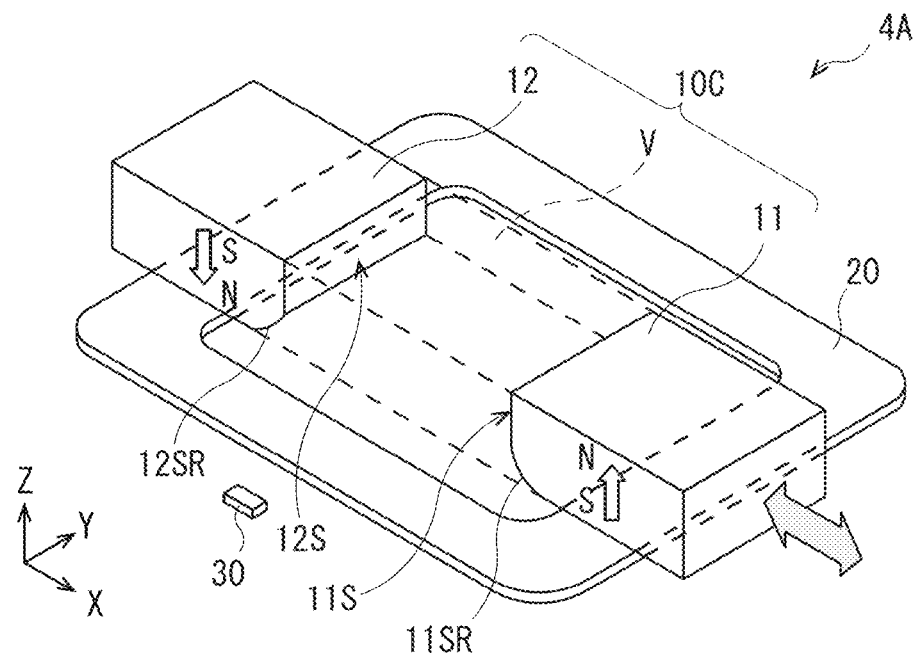
FIG. 11A is a perspective diagram illustrating a configuration example of a position detection device according to a modification example of the example embodiment illustrated in FIG. 10A.
Figure 11B:
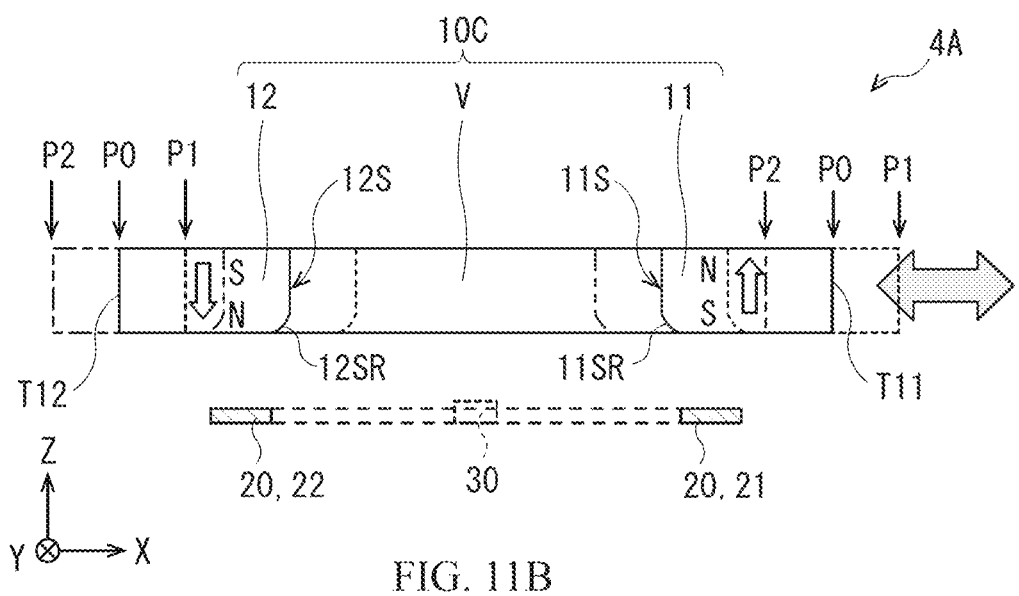
FIG. 11B is a cross-sectional diagram illustrating a cross-sectional configuration example of the position detection device according to the modification example illustrated in FIG. 11A.

In the position detection device 4, a part of the opposed surface 11S of the first magnetized region 11 may constitute the inclined surface 11SS that is flat, and a part of the opposed surface 12S of the second magnetized region 12 may constitute the inclined surface 12SS that is flat. However, embodiments of the disclosure are not limited thereto. For example, as in a position detection device 4A according to a modification example illustrated in FIGS. 11A and 11B, a part of the opposed surface 11S of the first magnetized region 11 may constitute a curved surface 11SR, and a part of the opposed surface 12S of the second magnetized region 12 may constitute a curved surface 12SR. Note that in the position detection device 4A, all of the opposed surface 11S of the first magnetized region 11 may constitute the curved surface 11SR, and all of the opposed surface 12S of the second magnetized region 12 may constitute the curved surface 12SR.

5. Fifth Example Embodiment

[Configuration of Position Detection Device 5]

A configuration of a position detection device 5 according to a fifth example embodiment of the disclosure will now be described with reference to FIGS. 12A and 12B.

Figure 12A:
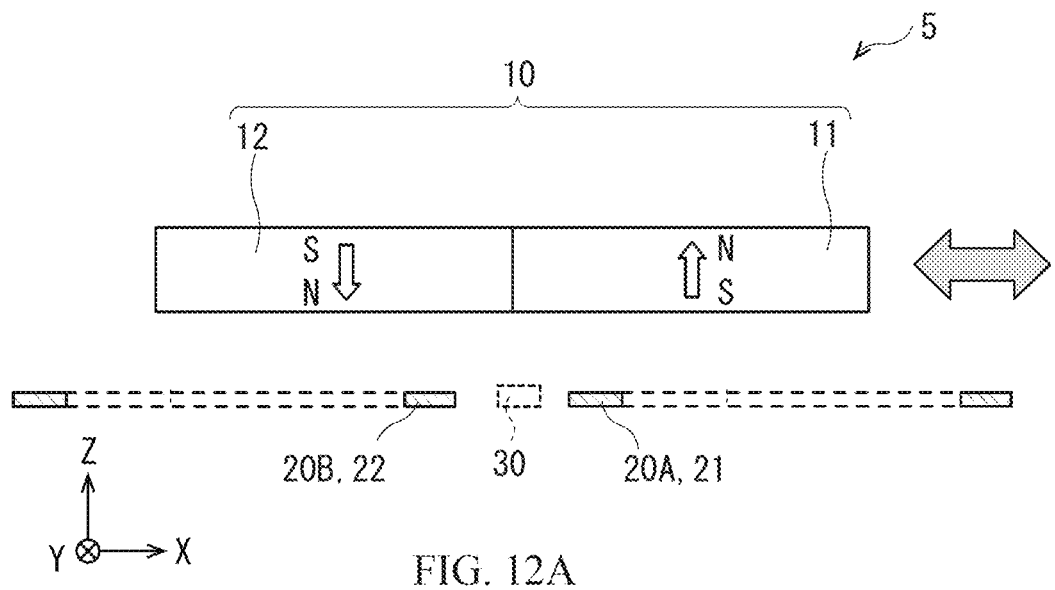
FIG. 12A is a cross-sectional diagram illustrating a cross-sectional configuration example of a position detection device according to one example embodiment of the disclosure.
Figure 12B:
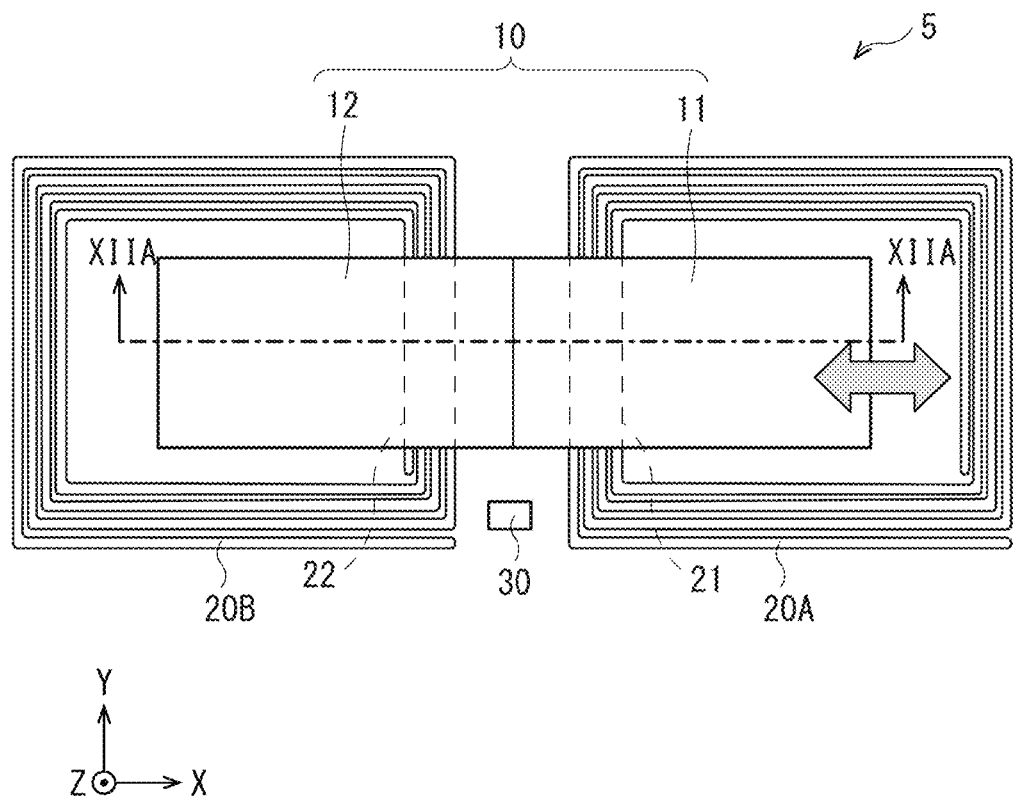
FIG. 12B is a plan view of the position detection device illustrated in FIG. 12A as viewed from above.

FIG. 12A is a cross-sectional diagram illustrating a cross-sectional configuration example of the position detection device 5. FIG. 12B is a plan view of the position detection device 5 as viewed from above. FIGS. 12A and 12B respectively correspond to FIGS. 1B and 1C illustrating the position detection device 1 according to the foregoing first example embodiment.

The position detection device 5 may include two driving coils 20A and 20B serving as the second magnetic field generator. The driving coil 20A may include the first part 21. The driving coil 20B may include the second part 22. The first part 21 of the driving coil 20A may be spaced from and overlap the first magnetized region 11 in the Z-axis direction, and the second part 22 of the driving coil 20B may be spaced from and overlap the second magnetized region 12 in the Z-axis direction. In the position detection device 5, the magnet 10 may move reversibly in the X-axis direction owing to both a magnetic field generated by the driving coil 20A and a magnetic field generated by the driving coil 20B. The magnetic field sensor 30 may be located between the driving coil 20A and the driving coil 20B in the X-axis direction, for example. As illustrated in FIG. 12A, the magnetic field sensor 30 may be provided at the same level at which the driving coils 20A and 20B are provided, for example. Further, in the X-axis direction, the driving coils 20A and 20B and the magnetic field sensor 30 may overlap each other at least partly.

[Example Workings and Example Effects of Position Detection Device 5]

Workings and effects similar to those achievable with the position detection device 1 according to the foregoing first example embodiment are also achievable with the position detection device 5 according to the present example embodiment.

First Modification Example of Fifth Example Embodiment

Figure 13:
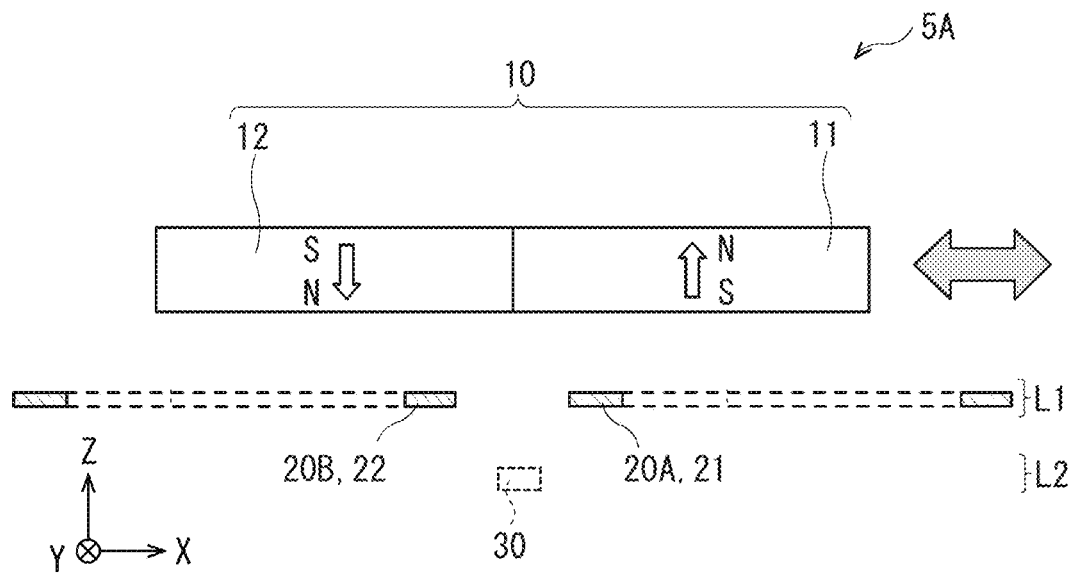
FIG. 13 is a cross-sectional diagram illustrating a cross-sectional configuration example of a position detection device according to a first modification example of the example embodiment illustrated in FIG. 12A.

FIG. 13 is a cross-sectional diagram illustrating a configuration of a position detection device 5A according to a first modification example of the fifth example embodiment of the disclosure. In some embodiments of the disclosure, as in the position detection device 5A, the magnetic field sensor 30 may be provided at a level L2 in the Z-axis direction different from a level L1 at which the driving coils 20A and 20B are provided.

Second Modification Example of Fifth Example Embodiment

Figure 14:
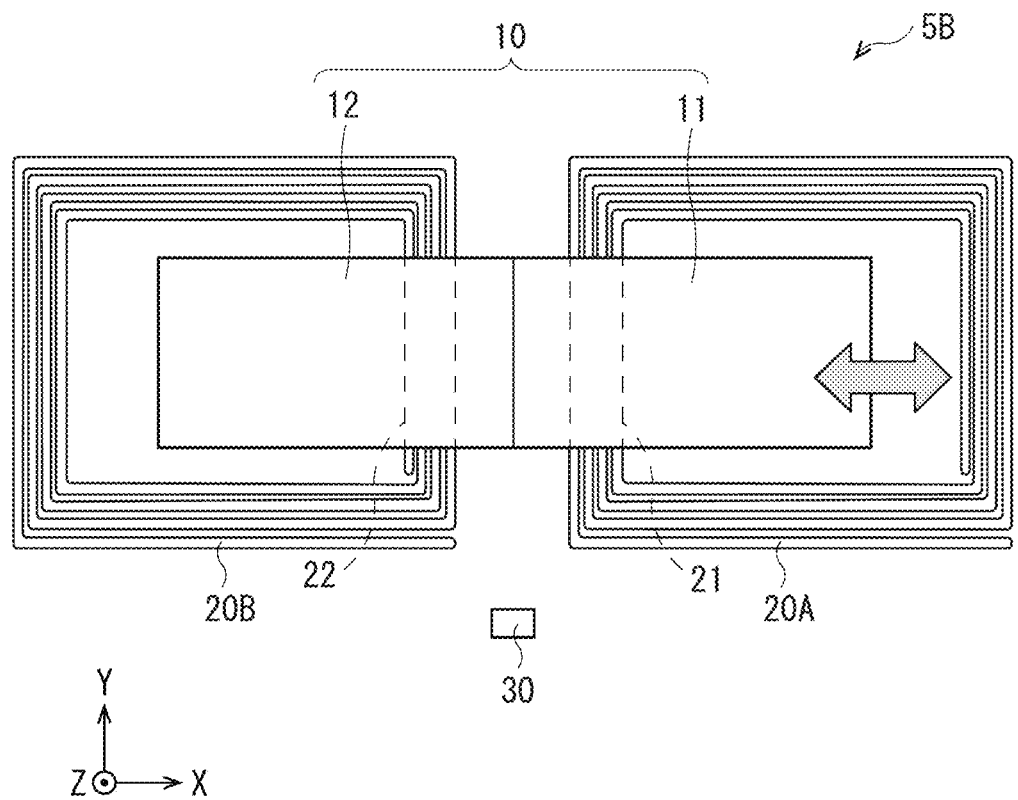
FIG. 14 is a plan view of a position detection device according to a second modification example of the example embodiment illustrated in FIG. 12A as viewed from above.

FIG. 14 is a plan diagram illustrating a configuration of a position detection device 5B according to a second modification example of the fifth example embodiment of the disclosure. In some embodiments of the disclosure, as in the position detection device 5B, the magnetic field sensor 30 may be provided at a position that deviates in the Y-axis direction from a region sandwiched between the driving coils 20A and 20B in a plan view.

Third Modification Example of Fifth Example Embodiment

Figure 15:
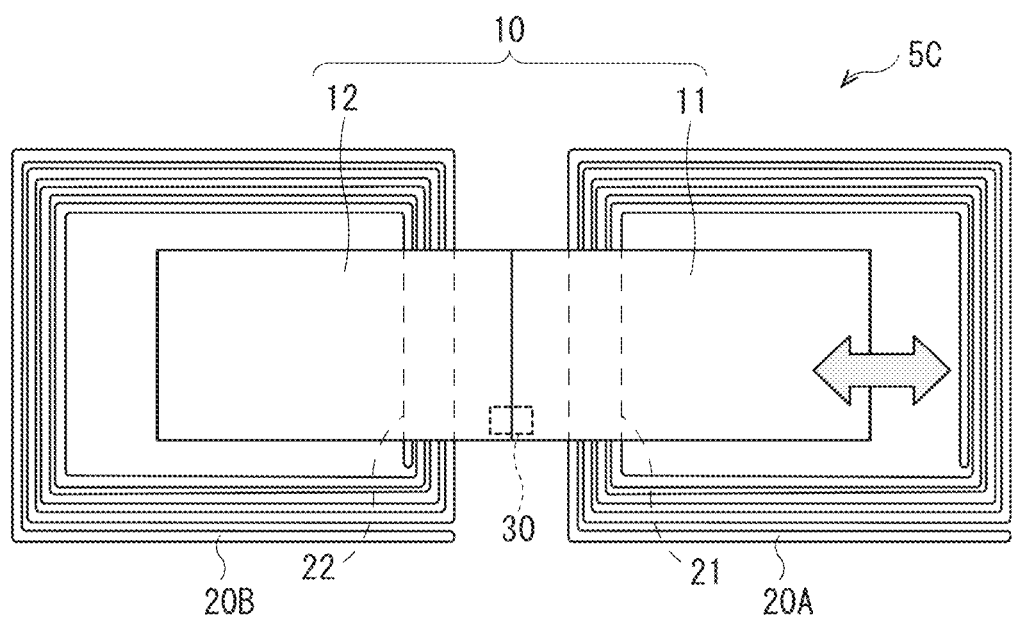
FIG. 15 is a plan view of a position detection device according to a third modification example of the example embodiment illustrated in FIG. 12A as viewed from above.

FIG. 15 is a plan diagram illustrating a configuration of a position detection device 5C according to a third modification example of the fifth example embodiment of the disclosure. In some embodiments of the disclosure, as in the position detection device 5C, the magnetic field sensor 30 may be located to overlap the magnet 10 in the Z-axis direction in a plan view.

6. Sixth Example Embodiment

[Configuration of Position Detection Device 6]

Figure 16:
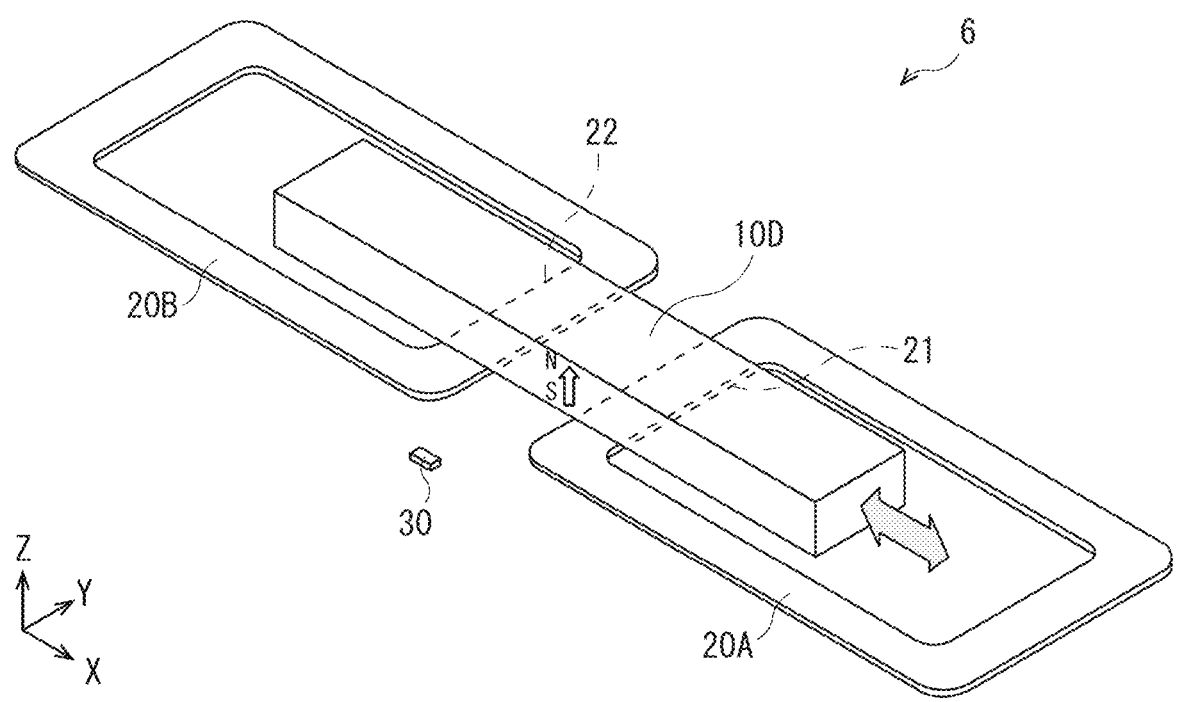
FIG. 16 is a perspective diagram illustrating a configuration example of a position detection device according to one example embodiment of the disclosure.

A configuration of a position detection device 6 according to a sixth example embodiment of the disclosure will now be described with reference to FIG. 16. FIG. 16 is a perspective diagram illustrating an overall configuration example of the position detection device 6. FIG. 16 corresponds to FIG. 1A illustrating the position detection device 1 according to the foregoing first example embodiment.

The position detection device 6 may include the two driving coils 20A and 20B as the second magnetic field generators, as with the position detection device 5 described in relation to the foregoing fifth example embodiment. The position detection device 6 may include a magnet 10D, instead of the magnet 10, as the first magnetic field generator. As illustrated in FIG. 16, all of the magnet 10D may constitute a region magnetized in the ±Z direction. However, the wording "all" is not intended to exclude a case where the magnet 10D partly includes an unmagnetized region or a region magnetized in the −Z direction. Further, embodiments of the disclosure are not limited to a case where the magnetizing direction exactly coincides with the ±Z direction, and may encompass a case where the magnetizing direction is inclined at an angle in a range from about 5° to about 10° with respect to the ±Z direction. In the position detection device 6, a part of the driving coil 20A, i.e., the first part 21, and a part of the driving coil 20B, i.e., the second part 22, may each be spaced from and each overlap the magnet 10D in the Z-axis direction. In the position detection device 6, the magnet 10D may move reversibly in the X-axis direction owing to both the magnetic field generated by the driving coil 20A and the magnetic field generated by the driving coil 20B. The magnetic field sensor 30 may be located between the driving coil 20A and the driving coil 20B in the X-axis direction, for example. For example, the magnetic field sensor 30 may be provided at the same level at which the driving coils 20A and 20B are provided, or at a level different from a level at which the driving coils 20A and 20B are provided.

[Example Workings and Example Effects of Position Detection Device 6]

Workings and effects similar to those achievable with the position detection device 1 according to the foregoing first example embodiment are also achievable with the position detection device 6 according to the present example embodiment. Furthermore, in the position detection device 6, the four-pole magnet 10 used in the position detection device 1 of the foregoing first example embodiment may be replaced with the two-pole magnet 10D. The magnet 10D is thus easily magnetizable and easily manufacturable as compared with the magnet 10.

7. Seventh Example Embodiment 7-1. Basic Configuration Example

[Configuration of Imaging Apparatus 100]

A configuration of an imaging apparatus 100 according to a seventh example embodiment of the disclosure will now be described with reference to FIG. 17A.

Figure 17A:
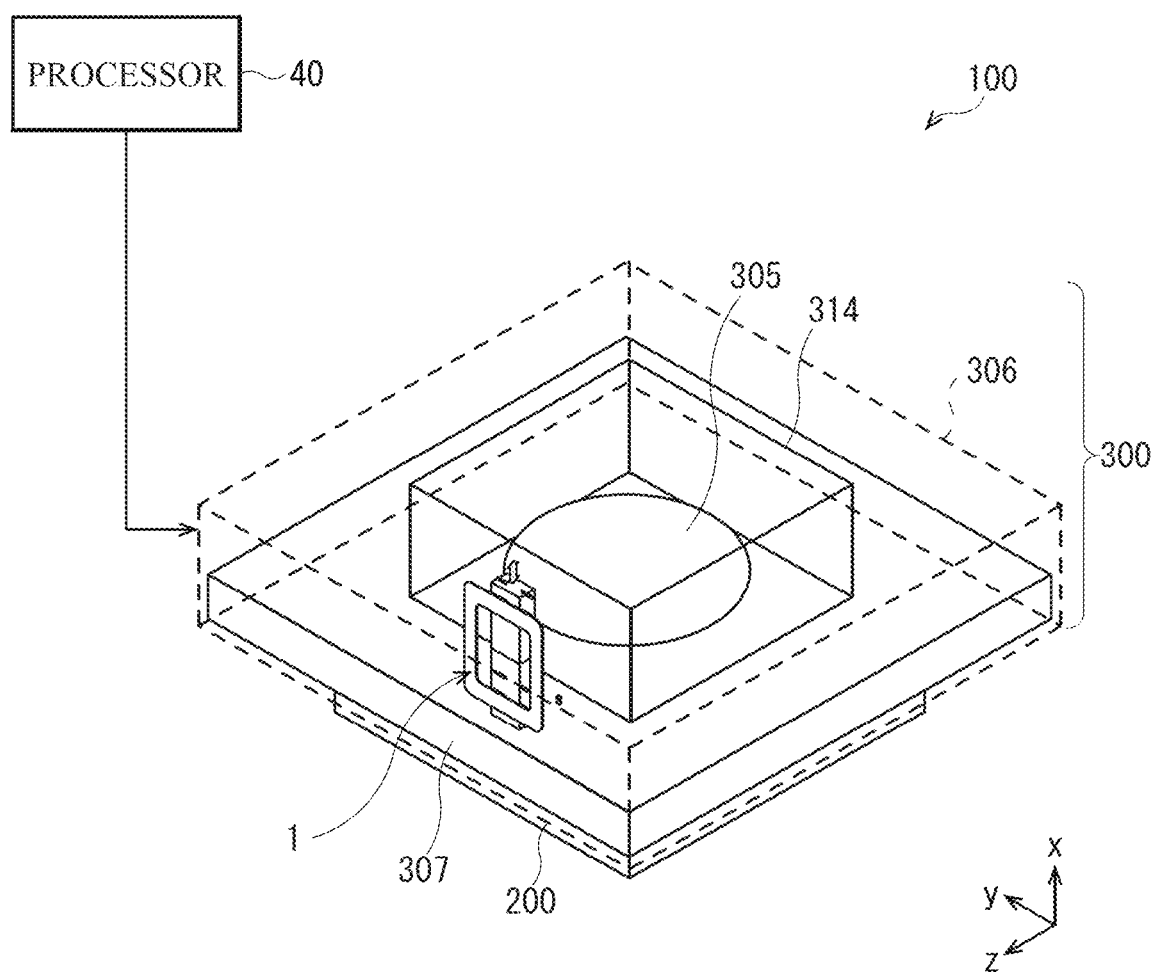
FIG. 17A is a schematic perspective diagram illustrating an overall configuration example of an imaging apparatus according to one example embodiment of the disclosure.

FIG. 17A is a perspective diagram illustrating an overall configuration example of the imaging apparatus 100. Note that the imaging apparatus 100 illustrated in FIG. 17A is merely exemplary. In any embodiment of the disclosure, components of the imaging apparatus 100 and their dimensions, shapes, and locations are not limited to those illustrated in FIG. 17A.

The imaging apparatus 100 may constitute, for example, a part of a camera for a smartphone having an autofocus mechanism. The imaging apparatus 100 includes an image sensor 200 as an imaging element, and a lens module 300, for example. The image sensor 200 may acquire an image by using a complementary metal-oxide semiconductor (CMOS), for example. The lens module 300 may guide light from a subject to the image sensor 200.

[Configuration of Lens Module 300]

The lens module 300 may include the position detection device 1 described in relation to the foregoing first example embodiment, a lens 305, a housing 306, a base 307, and a holding member 314. The position detection device 1 may be a magnetic position detection device and may detect the position of the lens 305 when automatic focusing is performed on light entering from the subject (hereinafter, simply "entering light") to allow the entering light to form an image on an imaging plane of the image sensor 200. The position detection device 1 may also serve as a driving device that moves the lens 305 to perform the focusing on the entering light, for example. The housing 306 may accommodate and protect the components including the position detection device 1. Note that in the imaging apparatus 100 of FIG. 17A, the position detection device 1 may be provided in an orientation allowing the magnet 10 to move in an x-axis direction. In the imaging apparatus 100 of FIG. 17A, the magnet 10 and the lens 305 may be moved in the x-axis direction to detect the positions of the magnet 10 and the lens 305 in the x-axis direction.

The lens 305 may be disposed above the base 307, being in an orientation allowing an optical axis of the lens 305 to coincide with the x-axis. The base 307 may have an opening that allows light having passed through the lens 305 to pass therethrough. The lens module 300 and the image sensor 200 may be in alignment with each other to allow the light from the subject to enter the image sensor 200 after passing through the lens 305 and the opening of the base 307 in this order.

The holding member 314 may hold the magnet 10 of the position detection device 1 and the lens 305 together. The holding member 314 may have, for example, a hollow cylinder shape to allow the lens 305 to be installed therein. The holding member 314 may be reversibly movable along a direction of the optical axis of the lens 305, that is, along the x-axis direction, with respect to the base 307. The base 307 may support the holding member 314 with use of a biasing member, such as a plurality of springs, to allow the holding member 314 to be movable along the x-axis direction with respect to the base 307.

[Operation of Imaging Apparatus 100]

Operation of the imaging apparatus 100 may be controlled by the processor 40 provided outside the imaging apparatus 100. The processor 40 may include, for example, circuitry including a central processing unit (CPU) as an arithmetic processing unit, a read only memory (ROM), and a random access memory (RAM). The ROM may be a memory element that holds a program, a calculation parameter, etc., to be used by the CPU. The RAM may be a memory element that temporarily holds, for example, a parameter that changes as appropriate for execution by the CPU.

The autofocus mechanism may be configured to detect an in-focus state of a subject using, for example, the image sensor 200 or an autofocus sensor. The processor 40 may cause the position detection device 1 to change a relative position of the lens 305 with respect to the base 307 along the x-axis to bring the subject into focus. This makes it possible to perform automatic focusing on the subject, for example.

[Example Workings and Example Effects of Imaging Apparatus 100]

The imaging apparatus 100 may include the position detection device 1 according to the foregoing first example embodiment. This helps to accurately detect the position or amount of displacement of the magnet 10 that moves together with the lens 305. Accordingly, it is possible for the imaging apparatus 100 to perform focusing with high accuracy.

7-2. Modification Example

Figure 17B:
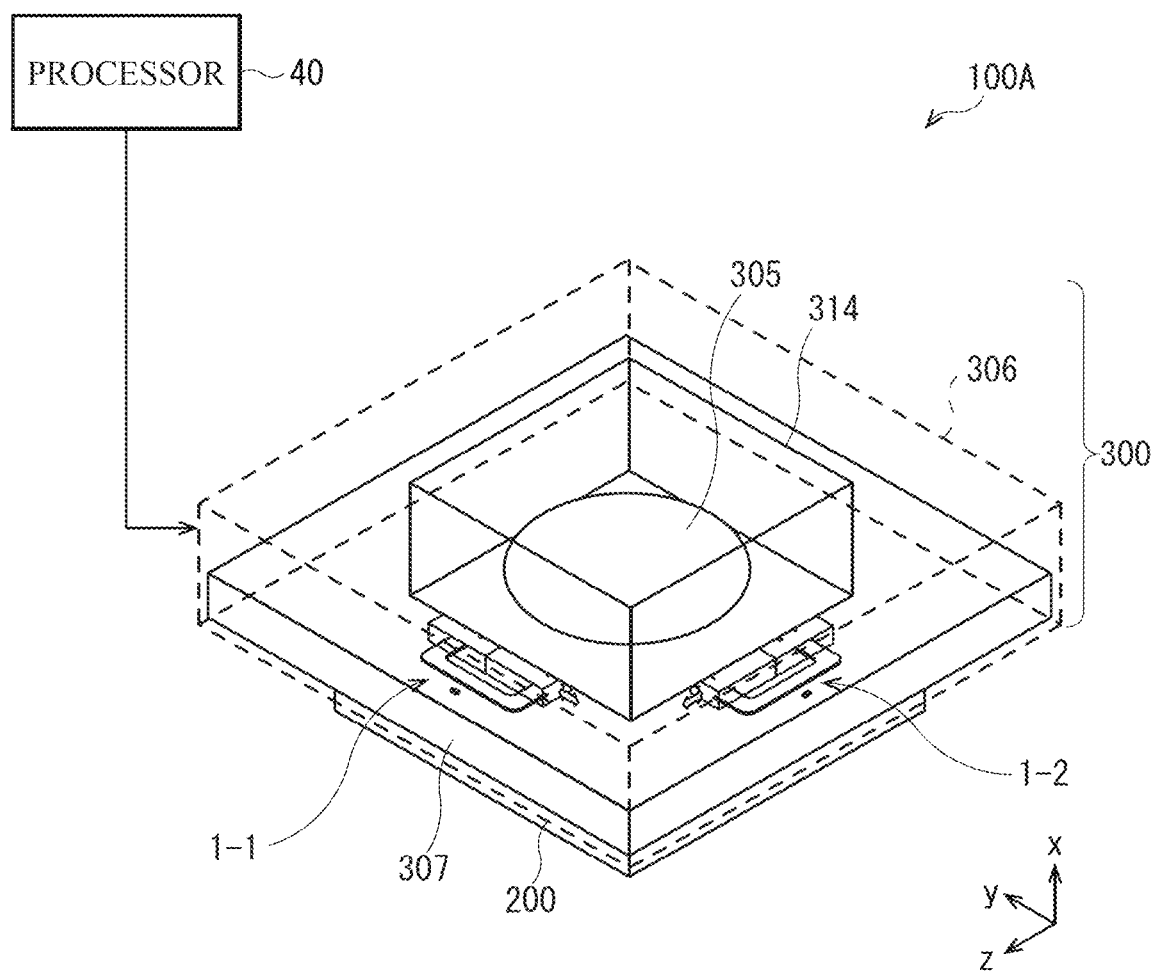
FIG. 17B is a schematic perspective diagram illustrating an overall configuration example of an imaging apparatus according to a modification example of the example embodiment illustrated in FIG. 17A.

FIG. 17B is a schematic perspective diagram illustrating an overall configuration example of an imaging apparatus 100A according to a modification example of the seventh example embodiment of the disclosure. The imaging apparatus 100A may include an optical image stabilization mechanism. The imaging apparatus 100A may include two position detection devices 1-1 and 1-2, instead of the position detection device 1. The position detection devices 1-1 and 1-2 may each have a configuration substantially the same as the configuration of the position detection device 1 described in relation to the foregoing first embodiment. However, the position detection device 1-1 may be provided to allow the magnet 10 to move in a y-axis direction together with the lens 305 and may detect the positions of the magnet 10 and the lens 305 in the y-axis direction. The position detection device 1-2 may be provided to allow the magnet 10 to move in a z-axis direction together with the lens 305 and may detect the positions of the magnet 10 and the lens 305 in the z-axis direction. The imaging apparatus 100A illustrated in FIG. 17B may be substantially the same in configuration as the imaging apparatus 100 illustrated in FIG. 17A, except for including the optical image stabilization mechanism instead of the autofocus mechanism.

The optical image stabilization mechanism may be configured to detect a hand-induced apparatus shake using, for example, a gyro sensor. The gyro sensor or other sensors may be provided outside the imaging apparatus 100A. Upon detection of a hand-induced apparatus shake by the optical image stabilization mechanism, the processor 40 may control each of the position detection devices 1-1 and 1-2 to cause the relative position of the lens 305 with respect to the base 307 to change in accordance with the mode of the apparatus shake. In each of the position detection devices 1-1 and 1-2, the magnet 10 may move together with the lens 305 in a predetermined direction, e.g., the y-axis direction or the z-axis direction orthogonal to the optical axis of the lens 305, upon supply of a current of a predetermined magnitude and in a predetermined direction to the driving coil 20 in response to a command from the processor 40. This helps to stabilize the absolute position of the lens 305 and to thereby reduce an influence of the apparatus shake. Note that the relative position of the lens 305 with respect to the base 307 may change either in a direction parallel to the y-axis or in a direction parallel to the z-axis, depending on the mode of the apparatus shake.

[Example Workings and Example Effects of Imaging Apparatus 100A]

The imaging apparatus 100A may include the position detection devices 1-1 and 1-2 each having a configuration substantially the same as the configuration of the position detection device 1 according to the foregoing first example embodiment. This helps to accurately detect the position or amount of displacement of the magnet 10 that moves together with the lens 305. Accordingly, it is possible for the imaging apparatus 100A to perform optical image stabilization with high accuracy.

The imaging apparatus 100A may also include the autofocus mechanism of the imaging apparatus 100. In such a case, it is possible for the imaging apparatus 100A to perform optical image stabilization with high accuracy and to perform focusing with high accuracy.

8. Other Modification Examples

Although some example embodiments of the disclosure have been described hereinabove, the disclosure is not limited to such example embodiments, and may be modified in a variety of ways. For example, in the foregoing example embodiments, the magnetic field sensor may form a half-bridge circuit with four resistors that include two resistors each exhibiting a sinusoidal change in output voltage versus the angle $\theta$ and two resistors each exhibiting a cosinusoidal change in output voltage versus the angle $\theta$. However, in some embodiments of the disclosure, a full-bridge circuit may be formed with a total of eight resistors that include four resistors each exhibiting a sinusoidal change in output voltage versus the angle $\theta$ and four resistors each exhibiting a cosinusoidal change in output voltage versus the angle $\theta$. Further, the MR elements included in each of the resistors may be identical with each other or different from each other in shape and/or dimensions. The resistors may include any magnetic detection elements. As used herein, the term "magnetic detection element" refers to an element having a function of detecting a magnetic field, and may encompass not only a spin-valve MR element but also other elements including, without limitation, an anisotropic magnetoresistive effect (AMR) element and a Hall element (including a planar Hall element and a vertical Hall element, for example). Further, for example, dimensions of the components and the layout of the components described herein are merely illustrative and non-limiting.

Figure 18:
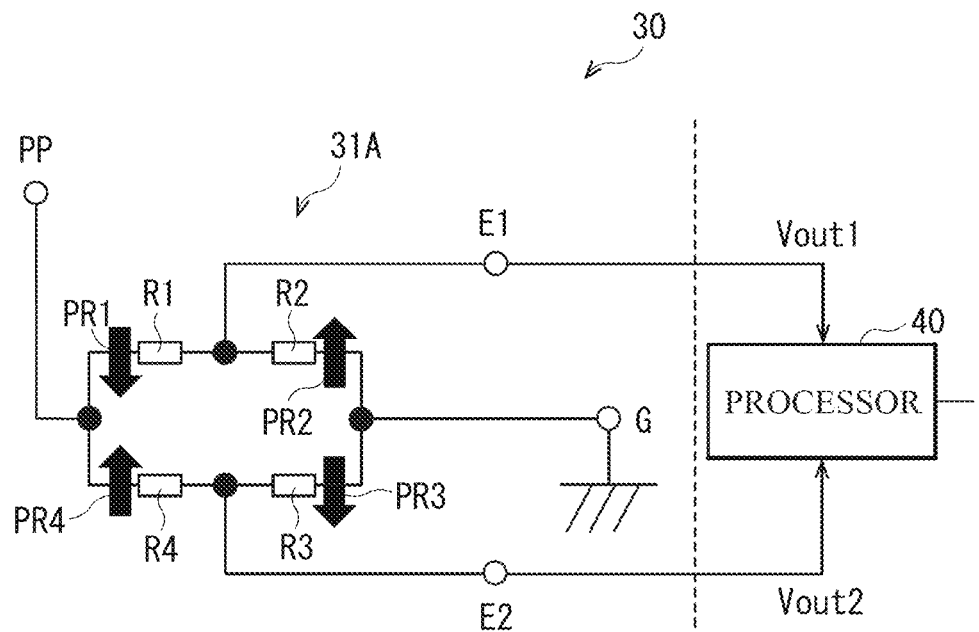
FIG. 18 is a circuit diagram illustrating a circuit configuration example of a magnetic field sensor in a position detection device according to a first other modification example of one example embodiment of the disclosure.
Figure 19:
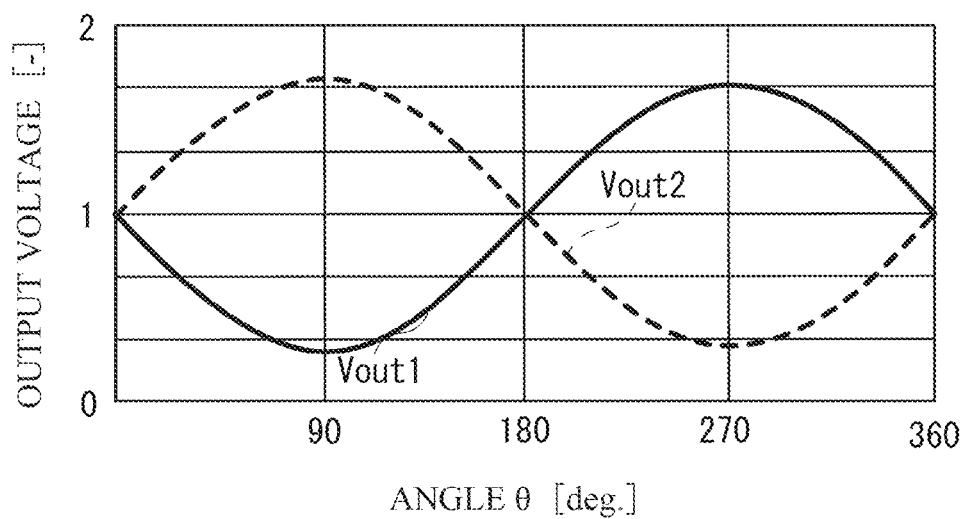
FIG. 19 is a characteristic diagram illustrating an output voltage characteristic obtainable from the magnetic field sensor having the example circuit configuration illustrated in FIG. 18.

Further, the configuration of the Wheatstone bridge circuit 31 illustrated in FIG. 3 is one example, and the magnetic field sensor 30 according to an embodiment of the disclosure is not limited to that illustrated in FIG. 3. The magnetic field sensor 30 may include, for example, a Wheatstone bridge circuit 31A illustrated in FIG. 18. In the Wheatstone bridge circuit 31A, the pinned direction PR1 of the first resistor R1 and the pinned direction PR2 of the second resistor R2 may be opposite to each other, and the pinned direction PR3 of the third resistor R3 and the pinned direction PR4 of the fourth resistor R4 may be opposite to each other. Further, the pinned direction PR1 of the first resistor R1 and the pinned direction PR3 of the third resistor R3 may be the same, and the pinned direction PR2 of the second resistor R2 and the pinned direction PR4 of the fourth resistor R4 may be the same. Accordingly, in the Wheatstone bridge circuit 31A illustrated in FIG. 18, as illustrated in FIG. 19, for example, a curve representing changes in the voltage Vout1 outputted to the output port E1 and a curve representing changes in the voltage Vout2 outputted to the output port E2 may have a phase difference of 180° from each other in relation to the angle θ.

Further, the position detection device according to an embodiment of the disclosure is not limited to a device intended to detect the position of a lens, and may be a device intended to detect a spatial position of any object other than a lens.

In the foregoing example embodiments, the magnet 10 may have a substantially rectangular parallelepiped shape in appearance; however, the shape of the first magnetic field generator according to an embodiment of the disclosure is not limited thereto. In some embodiments, the first magnetic field generator may include the first magnetized region 11 and the second magnetized region 12 that each have a shape so curved as to constitute a portion of an annular ring in appearance, as with respective magnets 10E to 10G of position detection devices 7A to 7C illustrated in FIGS. 20A to 20C. Note that the magnet 10E may have the space V between the first magnetized region 11 and the second magnetized region 12. The magnet 10F may include the third magnetized region 13 between the first magnetized region 11 and the second magnetized region 12. In the magnet 10G, the first magnetized region 11 and the second magnetized region 12 may adjoin each other. The magnets 10E to 10G may each rotate, around a rotation axis along the Y-axis direction, in directions indicated by an arrow R in an XZ plane. Note that the magnets 10E to 10G may each rotate within a range in which the first magnetized region 11 and the second magnetized region 12 each overlap a part of the driving coil 20 in the Z-axis direction. Such position detection devices 7A to 7C make it possible to detect respective rotation angles of the magnets 10E to 10G with high accuracy.

Figure 20A:
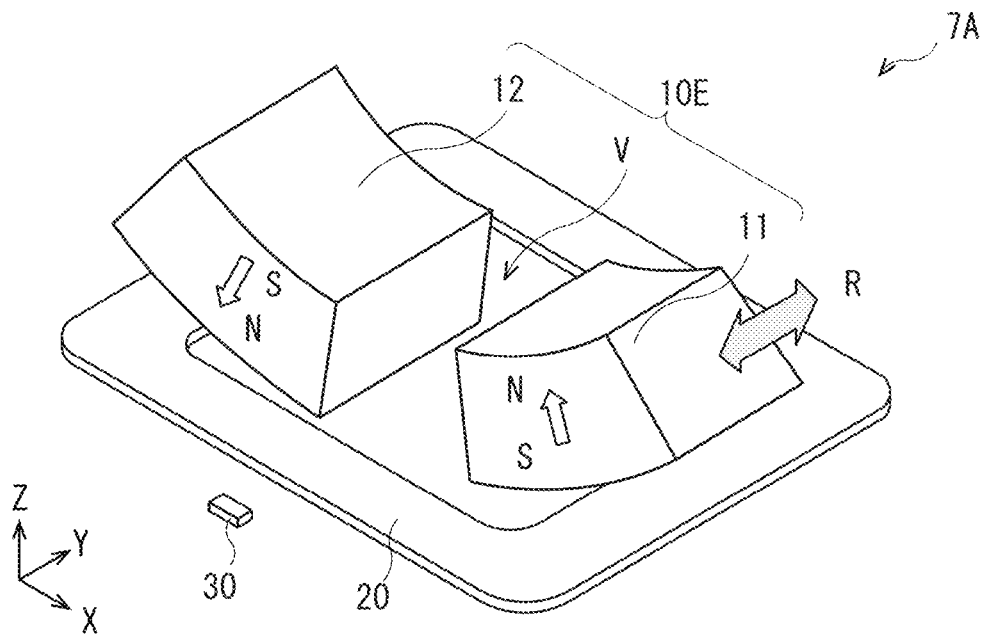
FIG. 20A is a schematic perspective diagram illustrating an overall configuration example of a position detection device according to a second other modification example of one example embodiment of the disclosure.
Figure 20B:
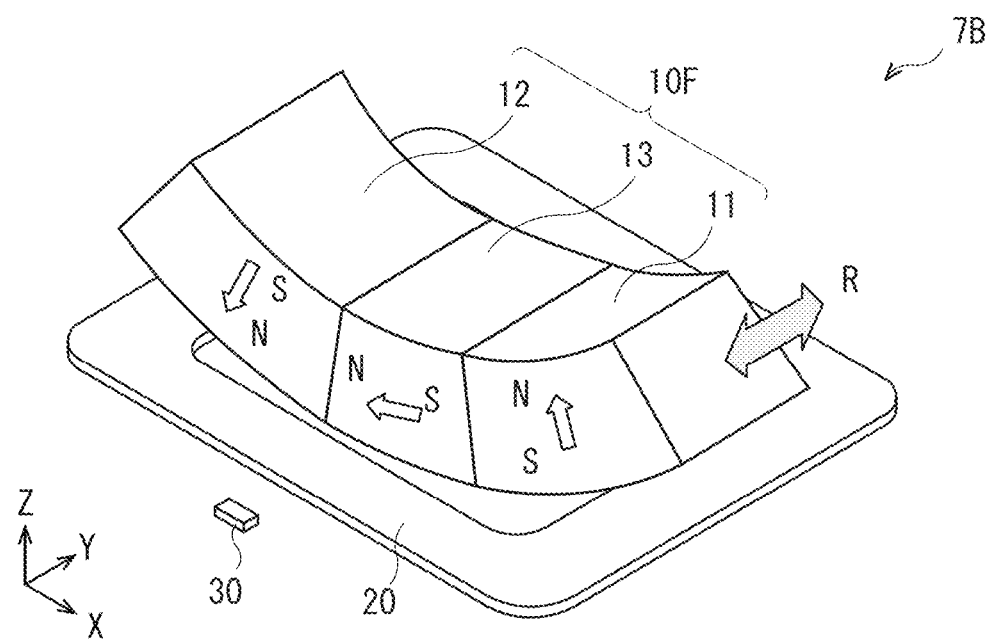
FIG. 20B is a schematic perspective diagram illustrating an overall configuration example of a position detection device according to a third other modification example of one example embodiment of the disclosure.
Figure 20C:
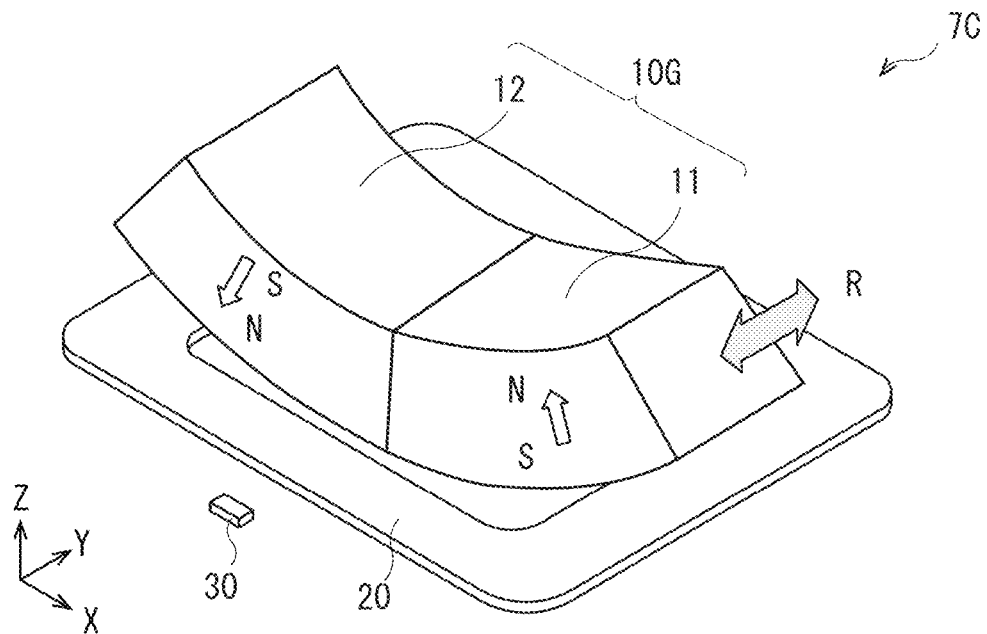
FIG. 20C is a schematic perspective diagram illustrating an overall configuration example of a position detection device according to a fourth other modification example of one example embodiment of the disclosure.
Figure 21:
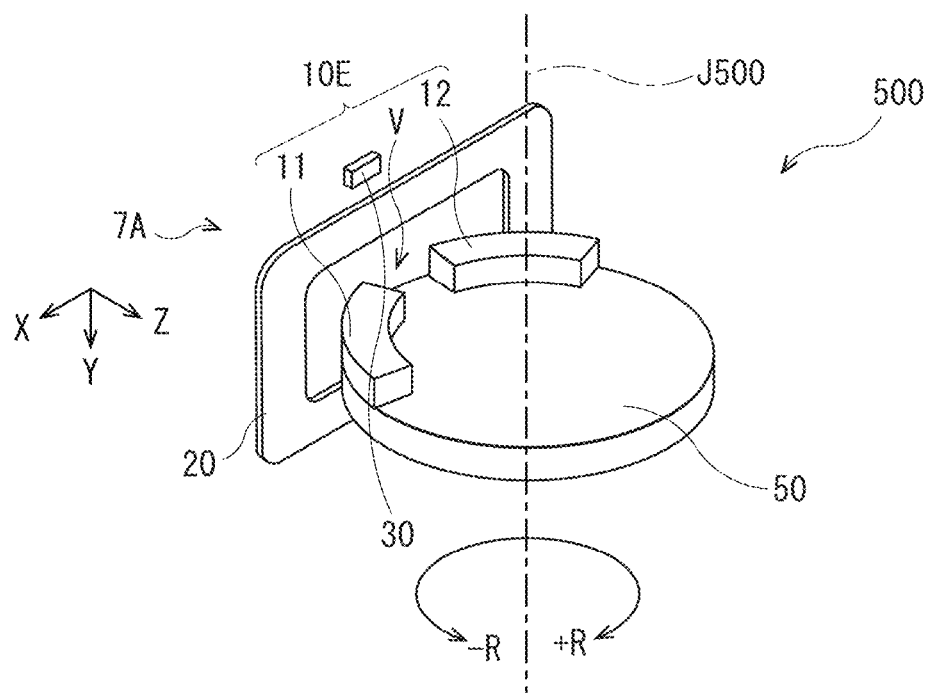
FIG. 21 is a schematic perspective diagram illustrating an overall configuration example of an angle sensor apparatus including the position detection device illustrated in FIG. 20A.

The position detection devices 7A to 7C illustrated in FIGS. 20A to 20C are each applicable to an angle sensor apparatus, for example. FIG. 21 illustrates an overall configuration example of an angle sensor apparatus 500 including the position detection device 7A, by way of example. The angle sensor apparatus 500 includes a rotating member 50 and the position detection device 7A. The rotating member 50 may be substantially disk-shaped. The rotating member 50 may be configured to rotate in a +R direction and a −R direction around a rotation axis J500 parallel to the Y-axis direction. The magnet 10E illustrated in FIG. 20A may be attached to the rotating member 50. The second magnetic field generated by the driving coil 20 may cause the magnet 10E to rotate together with the rotating member 50 in the +R direction and the −R direction. The magnetic field sensor 30 may detect a change in a magnetic field component, of the first magnetic field generated by the magnet 10E, that is parallel to the XY plane orthogonal to a radial direction of the rotating member 50, i.e., the Z-axis direction. This makes it possible for the magnetic field sensor 30 to detect the rotation angle of the rotating member 50 with high accuracy. Note that the angle sensor apparatus 500 may include the position detection device 7B or 7C instead of the position detection device 7A.

Figure 22:
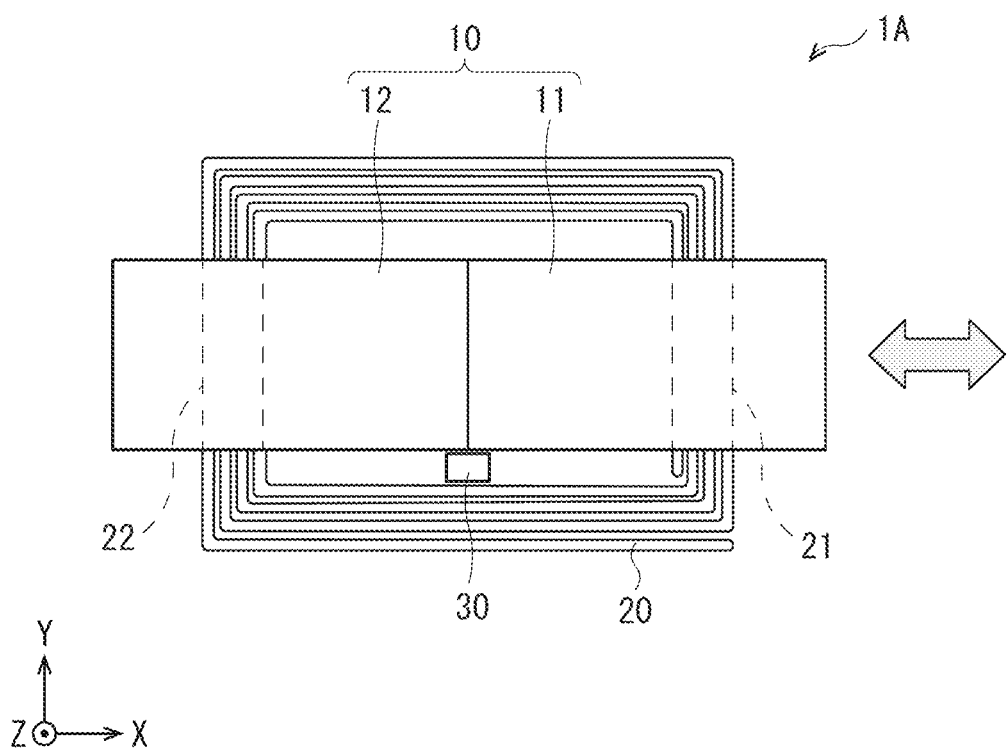
FIG. 22 is a schematic plan diagram illustrating an overall configuration example of a position detection device according to a fifth other modification example of one example embodiment of the disclosure.

In some embodiments of the disclosure, as in a position detection device 1A illustrated in FIG. 22, for example, the magnetic field sensor 30 may be disposed inside the driving coil 20 in a plan view as viewed in the Z-axis direction. In the position detection device 1A, the magnetic field sensor 30 may be provided at the same level at which the driving coil 20A is provided, or at a level different from a level at which the driving coil 20A is provided.

Figure 23A:
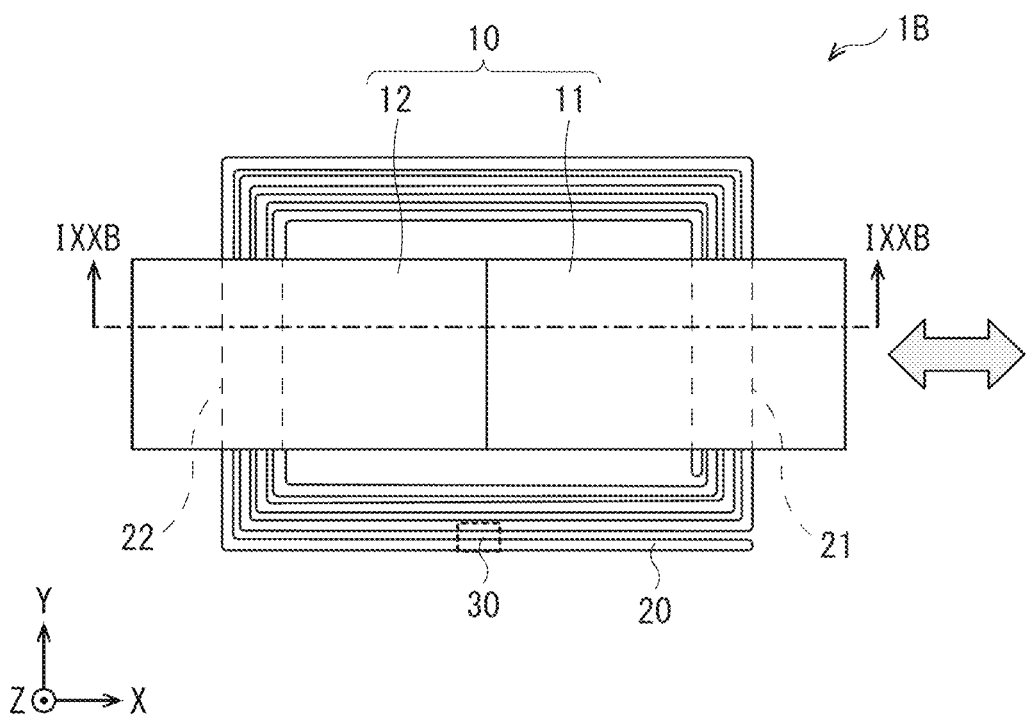
FIG. 23A is a schematic plan diagram illustrating an overall configuration example of a position detection device according to a sixth other modification example of one example embodiment of the disclosure.
Figure 23B:
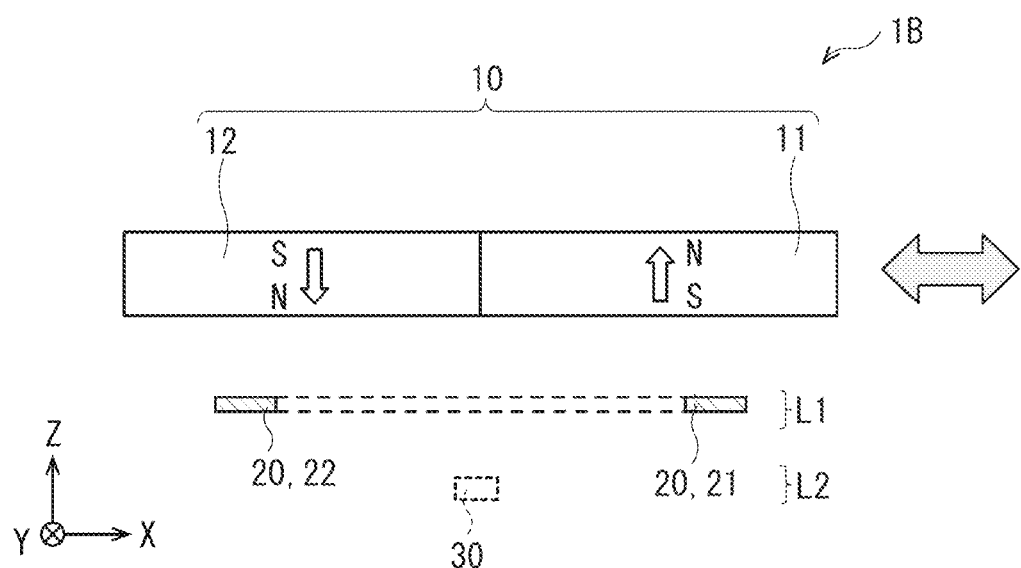
FIG. 23B is a schematic cross-sectional diagram illustrating the overall configuration example of the position detection device according to the sixth other modification example illustrated in FIG. 23A.

Further, in some embodiments, as in a position detection device 1B illustrated in FIGS. 23A and 23B, the magnetic field sensor 30 may be located to overlap a part of the driving coil 20 in the Z-axis direction, for example. In the position detection device 1B, as illustrated in FIG. 23B, the magnetic field sensor 30 may be provided at the level L2 different from the level L1 at which the driving coil 20 is provided.

Figure 24A:
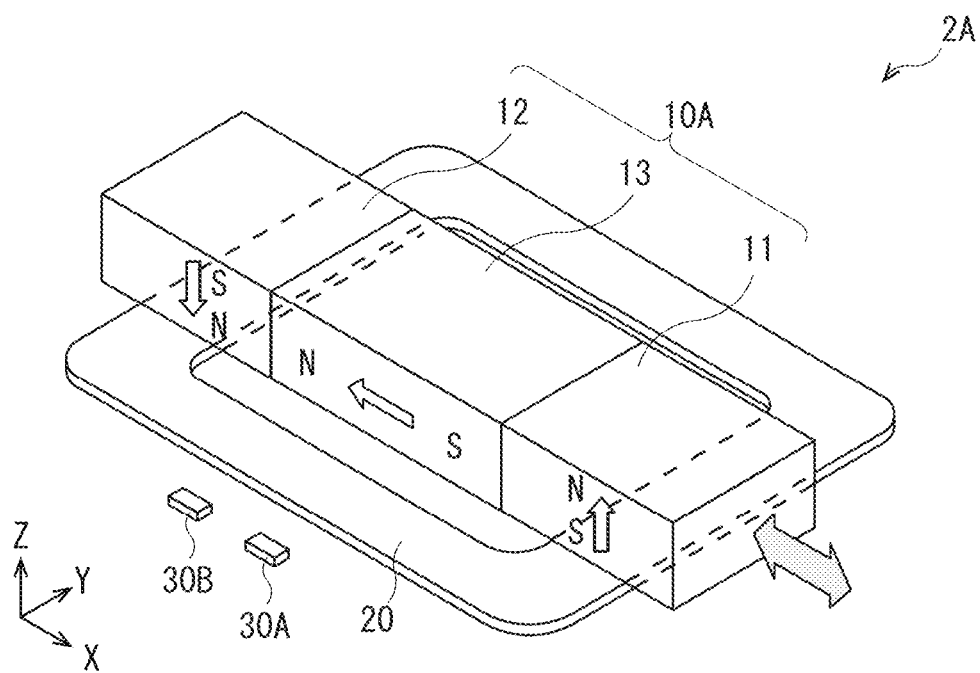
FIG. 24A is a schematic perspective diagram illustrating an overall configuration example of a position detection device according to a seventh other modification example of one example embodiment of the disclosure.
Figure 24B:
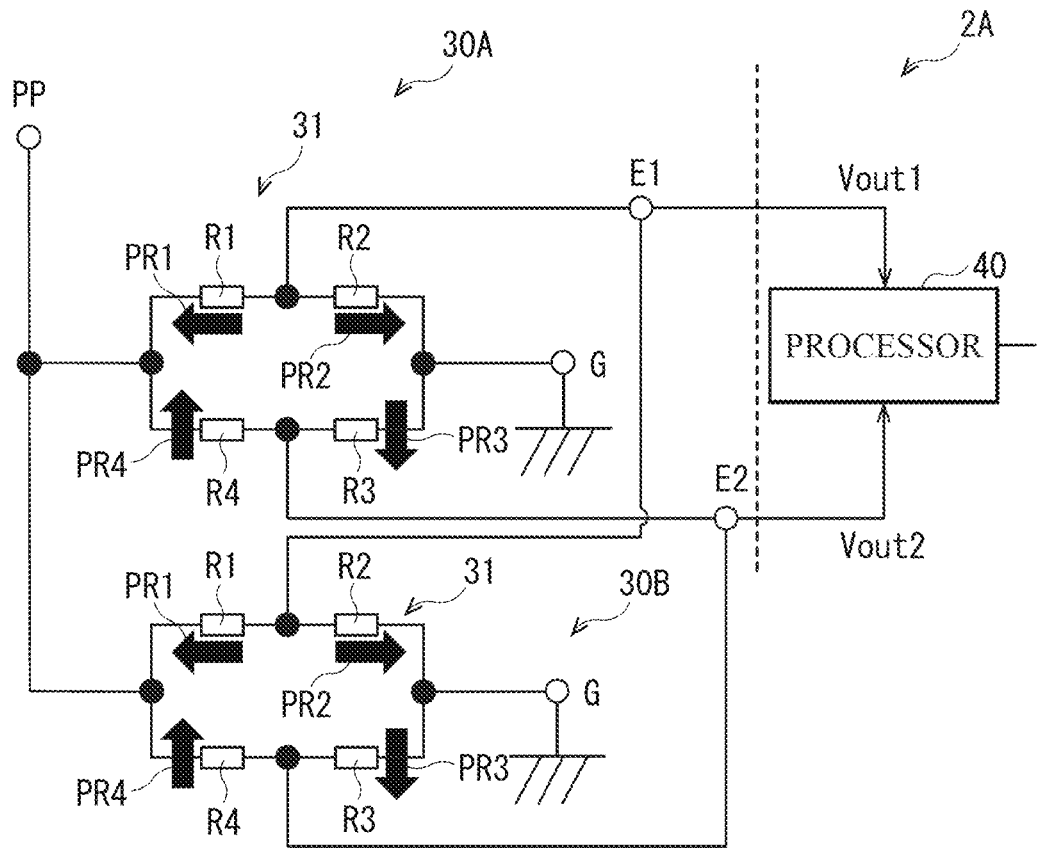
FIG. 24B is a circuit diagram illustrating a circuit configuration example of a magnetic field sensor in the position detection device according to the seventh other modification example illustrated in FIG. 24A.

In the foregoing example embodiments and modification examples, the description has been given with reference to the position detection device including a single magnetic field sensor by way of example; however, embodiments of the disclosure are not limited thereto. For example, as in a position detection device 2A illustrated in FIGS. 24A and 24B, two magnetic field sensors 30A and 30B may be provided for a single magnet 10A. FIG. 24A is a schematic perspective diagram illustrating an overall configuration example of the position detection device 2A according to a seventh other modification example of an embodiment of the disclosure. FIG. 24B is a circuit diagram illustrating a circuit configuration example of the magnetic field sensors 30A and 30B in the position detection device 2A. The magnetic field sensors 30A and 30B may each include the Wheatstone bridge circuit 31 and may be coupled to each other. The magnetic field sensors 30A and 30B may be arranged in the X-axis direction in which the magnet 10A moves. Note that the number of the magnetic field sensors in the position detection device according to the present modification example is not limited to two, and may be three or more. It is possible for such a position detection device 2A to achieve effects similar to the effects achievable with the position detection device 2 described in relation to the foregoing second example embodiment. Note that the position detection device according to any of some embodiments other than the second example embodiment or in any of some modification examples may also include two or more magnetic field sensors.

Further, in the foregoing example embodiments and modification examples, the description has been given with reference to the coil that generates the second magnetic field as an example of the driver; however, embodiments of the disclosure are not limited thereto. In some embodiments, any of other devices that each generate a driving force to drive the first magnetic field generator and other components may be used as the driver, instead of the coil. Non-limiting examples of such other devices may include various kinds of motors and actuators.

Furthermore, the disclosure encompasses any possible combination of some or all of the various embodiments and the modification examples described herein and incorporated herein.

It is possible to achieve at least the following configurations from the foregoing example embodiments and modification examples of the disclosure.

(1)
A position detection device including:
a first magnetic field generator generating a first magnetic field;
a driver opposed to the first magnetic field generator in a first-axis direction and configured to generate a driving force to thereby cause the first magnetic field generator to move in a second-axis direction parallel to a first plane orthogonal to the first-axis direction; and
a magnetic field sensor configured to detect a magnetic field component, of the first magnetic field, that is parallel to the first plane, in which
the first magnetic field generator is movable in the second-axis direction with respect to the driver and the magnetic field sensor,
the driver is spaced from and overlaps a part of the first magnetic field generator in the first-axis direction, and extends across the part of the first magnetic field generator in a third-axis direction parallel to the first plane and orthogonal to the second-axis direction, and
a center position of the magnetic field sensor in the third-axis direction is different from a center position of the first magnetic field generator in the third-axis direction.

(2)
The position detection device according to (1), in which the first magnetic field generator is movable along the second-axis direction between a first position and a second position both inclusive, while remaining in a state of overlapping a part of the driver in the first-axis direction.

(3)
The position detection device according to (1), in which the driver includes a second magnetic field generator configured to generate a second magnetic field as the driving force.

(4)
The position detection device according to (1), in which the first magnetic field generator includes
a first magnetized region magnetized in a first direction along the first-axis direction, and
a second magnetized region magnetized in a second direction along the first-axis direction, the second direction being opposite to the first direction.

(5)
The position detection device according to (4), in which the first magnetized region and the second magnetized region are arranged along the second-axis direction.

(6)
The position detection device according to (5), in which the first magnetized region includes a first S pole and a first N pole that are arranged in the first direction, and the second magnetized region includes a second S pole and a second N pole that are arranged in the second direction.

(7)
The position detection device according to (5), in which the first magnetized region and the second magnetized region are in contact with each other.

(8)
The position detection device according to (3), in which
the first magnetic field generator includes: a first magnetized region magnetized in a first direction along the first-axis direction; and a second magnetized region magnetized in a second direction along the first-axis direction, the second direction being opposite to the first direction,
the second magnetic field generator includes: a first part that is spaced from and overlaps the first magnetized region in the first-axis direction; and a second part that is spaced from and overlaps the second magnetized region in the first-axis direction, and
the first magnetic field generator is movable along the second-axis direction between a first position and a second position both inclusive, while remaining in a state in which the first magnetized region overlaps the first part and the second magnetized region overlaps the second part.

(9)
The position detection device according to (8), in which
the driver includes a coil wound in a plane parallel to the first plane, and
a direction of the second magnetic field to be generated by the first part and exerted on the first magnetized region is opposite to a direction of the second magnetic field to be generated by the second part and exerted on the second magnetized region.

(10)
The position detection device according to (5), in which
the first magnetized region and the second magnetized region are at a distance from each other, and
the first magnetic field generator further includes a third magnetized region between the first magnetized region and the second magnetized region, the third magnetized region being magnetized in a third direction along the second-axis direction.

(11)
The position detection device according to (5), in which
the first magnetized region and the second magnetized region are at a distance from each other, and
the first magnetic field generator has a space between the first magnetized region and the second magnetized region, or includes an unmagnetized region between the first magnetized region and the second magnetized region.

(12)
The position detection device according to (5), in which
the first magnetized region and the second magnetized region are at a distance from each other,
the first magnetized region includes a first opposed surface opposed to the second magnetized region,
the second magnetized region includes a second opposed surface opposed to the first magnetized region, and
all or a part of the first opposed surface and all or a part of the second opposed surface are inclined surfaces or curved surfaces, the inclined surfaces being in parallel in the third-axis direction and inclined with respect to the first plane.

(13)
The position detection device according to (3), in which
the second magnetic field generator includes a coil wound in a plane parallel to the first plane, and
the magnetic field sensor is disposed inside the coil in a plan view as viewed in the first-axis direction.

(14)
The position detection device according to (3), in which
the second magnetic field generator includes a coil wound in a plane parallel to the first plane, and
the magnetic field sensor is disposed outside the coil in a plan view as viewed in the first-axis direction.

(15)
The position detection device according to (13) or (14), in which all or a part of the coil and all or a part of the magnetic field sensor overlap each other in the third-axis direction.

(16)
The position detection device according to (13) or (14), in which
the coil is provided at a first level parallel to the first plane, and
the magnetic field sensor is at a second level parallel to the first plane and different from the first level.

(17)
The position detection device according to (5), in which
the driver includes a second magnetic field generator configured to generate a second magnetic field as the driving force,
the second magnetic field generator includes a first coil and a second coil that are spaced from each other,
a part of the first coil is opposed to the first magnetized region in the first-axis direction,
a part of the second coil is opposed to the second magnetized region in the first-axis direction, and
the magnetic field sensor is located between the first coil and the second coil in the second-axis direction.

(18)
The position detection device according to (17), in which the first coil, the second coil, and the magnetic field sensor overlap each other in the second-axis direction.

(19)
The position detection device according to (17), in which
the first coil and the second coil are provided at a first level parallel to the first plane, and
the magnetic field sensor is at a second level parallel to the first plane and different from the first level.

(20)
The position detection device according to (3), in which
the first magnetic field generator includes a magnetized region including an S pole and an N pole that are arranged along the first-axis direction,
the second magnetic field generator includes a first coil and a second coil that are spaced from each other,
a part of the first coil and a part of the second coil are each opposed to the magnetized region in the first-axis direction, and
the magnetic field sensor is located between the first coil and the second coil in the second-axis direction.

(21)
The position detection device according to (1), in which a plurality of the magnetic field sensors is arranged in the second-axis direction.

(22)
A lens module including:
a first magnetic field generator generating a first magnetic field;
a driver opposed to the first magnetic field generator in a first-axis direction and configured to generate a driving force to thereby cause the first magnetic field generator to move in a second-axis direction parallel to a first plane orthogonal to the first-axis direction;
a magnetic field sensor configured to detect a magnetic field component, of the first magnetic field, that is parallel to the first plane; and
a lens, in which
the first magnetic field generator and the lens are movable together in the second-axis direction with respect to the driver and the magnetic field sensor,
the driver is spaced from and overlaps a part of the first magnetic field generator in the first-axis direction, and extends across the part of the first magnetic field generator in a third-axis direction parallel to the first plane and orthogonal to the second-axis direction, and
a center position of the magnetic field sensor in the third-axis direction is different from a center position of the first magnetic field generator in the third-axis direction.

(23)
An imaging apparatus including
an imaging element, and
a lens module,
the lens module including:
a first magnetic field generator generating a first magnetic field;
a driver opposed to the first magnetic field generator in a first-axis direction and configured to generate a driving force to thereby cause the first magnetic field generator to move in a second-axis direction parallel to a first plane orthogonal to the first-axis direction;
a magnetic field sensor configured to detect a magnetic field component, of the first magnetic field, that is parallel to the first plane; and
a lens, in which
the first magnetic field generator and the lens are movable together in the second-axis direction with respect to the driver and the magnetic field sensor,
the driver is spaced from and overlaps a part of the first magnetic field generator in the first-axis direction, and extends across the part of the first magnetic field generator in a third-axis direction parallel to the first plane and orthogonal to the second-axis direction, and
a center position of the magnetic field sensor in the third-axis direction is different from a center position of the first magnetic field generator in the third-axis direction.

(24)
The imaging apparatus according to (23), further including a processor, in which
the lens has an optical axis along the second-axis direction, and
the processor is configured to perform focusing on a subject by causing the driver to generate the driving force and thereby causing the first magnetic field generator and the lens to move along a direction of the optical axis.

(25)
The imaging apparatus according to (23), further including a processor, in which
the lens has an optical axis along the second-axis direction, and
the processor is configured to perform focusing on a subject by causing the driver to generate the driving force and thereby causing the first magnetic field generator and the lens to move along a plane orthogonal to a direction of the optical axis.

(26) An angle sensor apparatus including
a rotating member, and
a position detection device,
the position detection device including:
a first magnetic field generator provided on the rotating member and generating a first magnetic field;
a driver opposed to the first magnetic field generator in a first-axis direction and configured to generate a driving force to thereby cause the first magnetic field generator and the rotating member to rotate in a rotating direction along the second-axis direction parallel to a first plane orthogonal to the first-axis direction; and
a magnetic field sensor configured to detect a magnetic field component, of the first magnetic field, that is parallel to the first plane, in which
the first magnetic field generator and the rotating member are rotatable in the rotating direction along the second-axis direction with respect to the driver and the magnetic field sensor,
the driver is spaced from and overlaps a part of the first magnetic field generator in the first-axis direction, and extends across the part of the first magnetic field generator in a third-axis direction parallel to the first plane and orthogonal to the second-axis direction, and
a center position of the magnetic field sensor in the third-axis direction is different from a center position of the first magnetic field generator in the third-axis direction.

The position detection device, the lens module, the imaging apparatus, and the angle sensor apparatus according to at least one embodiment of the disclosure each make it possible to achieve superior detection performance.

Although the disclosure has been described hereinabove in terms of the example embodiment and modification examples, the disclosure is not limited thereto. It should be appreciated that variations may be made in the described example embodiment and modification examples by those skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. The use of the terms first, second, etc. do not denote any order or importance, but rather the terms first, second, etc. are used to distinguish one element from another. The term "substantially" and its variants are defined as being largely but not necessarily wholly what is specified as understood by one of ordinary skill in the art. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A position detection device comprising:
a first magnetic field generator generating a first magnetic field;
a driver opposed to the first magnetic field generator in a first-axis direction and configured to generate a driving force to thereby cause the first magnetic field generator to move in a second-axis direction parallel to a first plane orthogonal to the first-axis direction; and
a magnetic field sensor configured to detect a magnetic field component, of the first magnetic field, that is parallel to the first plane, wherein
the first magnetic field generator is movable in the second-axis direction with respect to the driver and the magnetic field sensor,
the driver is spaced from and overlaps a part of the first magnetic field generator in the first-axis direction, and extends across the part of the first magnetic field generator in a third-axis direction parallel to the first plane and orthogonal to the second-axis direction, and
a center position of the magnetic field sensor in the third-axis direction is different from a center position of the first magnetic field generator in the third-axis direction.

2. The position detection device according to claim 1, wherein the first magnetic field generator is movable along the second-axis direction between a first position and a second position both inclusive, while remaining in a state of overlapping a part of the driver in the first-axis direction.

3. The position detection device according to claim 1, wherein the driver comprises a second magnetic field generator configured to generate a second magnetic field as the driving force.

4. The position detection device according to claim 1, wherein the first magnetic field generator includes
a first magnetized region magnetized in a first direction along the first-axis direction, and
a second magnetized region magnetized in a second direction along the first-axis direction, the second direction being opposite to the first direction.

5. The position detection device according to claim 4, wherein the first magnetized region and the second magnetized region are arranged along the second-axis direction.

6. The position detection device according to claim 5, wherein
the first magnetized region includes a first S pole and a first N pole that are arranged in the first direction, and
the second magnetized region includes a second S pole and a second N pole that are arranged in the second direction.

7. The position detection device according to claim 5, wherein the first magnetized region and the second magnetized region are in contact with each other.

8. The position detection device according to claim 3, wherein
the first magnetic field generator includes: a first magnetized region magnetized in a first direction along the first-axis direction; and a second magnetized region magnetized in a second direction along the first-axis direction, the second direction being opposite to the first direction,
the second magnetic field generator includes: a first part that is spaced from and overlaps the first magnetized region in the first-axis direction; and a second part that is spaced from and overlaps the second magnetized region in the first-axis direction, and
the first magnetic field generator is movable along the second-axis direction between a first position and a second position both inclusive, while remaining in a state in which the first magnetized region overlaps the first part and the second magnetized region overlaps the second part.

9. The position detection device according to claim 8, wherein the driver comprises a coil wound in a plane parallel to the first plane, and
a direction of the second magnetic field to be generated by the first part and exerted on the first magnetized region is opposite to a direction of the second magnetic field to be generated by the second part and exerted on the second magnetized region.

10. The position detection device according to claim 5, wherein
the first magnetized region and the second magnetized region are at a distance from each other, and
the first magnetic field generator further includes a third magnetized region between the first magnetized region and the second magnetized region, the third magnetized region being magnetized in a third direction along the second-axis direction.

11. The position detection device according to claim 5, wherein
the first magnetized region and the second magnetized region are at a distance from each other, and
the first magnetic field generator has a space between the first magnetized region and the second magnetized region, or includes an unmagnetized region between the first magnetized region and the second magnetized region.

12. The position detection device according to claim 5, wherein
the first magnetized region and the second magnetized region are at a distance from each other,
the first magnetized region includes a first opposed surface opposed to the second magnetized region,
the second magnetized region includes a second opposed surface opposed to the first magnetized region, and
all or a part of the first opposed surface and all or a part of the second opposed surface are inclined surfaces or curved surfaces, the inclined surfaces being in parallel in the third-axis direction and inclined with respect to the first plane.

13. The position detection device according to claim 3, wherein
the second magnetic field generator comprises a coil wound in a plane parallel to the first plane, and
the magnetic field sensor is disposed inside the coil in a plan view as viewed in the first-axis direction.

14. The position detection device according to claim 3, wherein
the second magnetic field generator comprises a coil wound in a plane parallel to the first plane, and
the magnetic field sensor is disposed outside the coil in a plan view as viewed in the first-axis direction.

15. The position detection device according to claim 13, wherein all or a part of the coil and all or a part of the magnetic field sensor overlap each other in the third-axis direction.

16. The position detection device according to claim 13, wherein
the coil is provided at a first level parallel to the first plane, and
the magnetic field sensor is at a second level parallel to the first plane and different from the first level.

17. The position detection device according to claim 5, wherein
the driver comprises a second magnetic field generator configured to generate a second magnetic field as the driving force,
the second magnetic field generator includes a first coil and a second coil that are spaced from each other,
a part of the first coil is opposed to the first magnetized region in the first-axis direction,
a part of the second coil is opposed to the second magnetized region in the first-axis direction, and
the magnetic field sensor is located between the first coil and the second coil in the second-axis direction.

18. The position detection device according to claim 17, wherein the first coil, the second coil, and the magnetic field sensor overlap each other in the second-axis direction.

19. The position detection device according to claim 17, wherein
the first coil and the second coil are provided at a first level parallel to the first plane, and
the magnetic field sensor is at a second level parallel to the first plane and different from the first level.

20. The position detection device according to claim 3, wherein
the first magnetic field generator includes a magnetized region including an S pole and an N pole that are arranged along the first-axis direction,
the second magnetic field generator includes a first coil and a second coil that are spaced from each other,
a part of the first coil and a part of the second coil are each opposed to the magnetized region in the first-axis direction, and
the magnetic field sensor is located between the first coil and the second coil in the second-axis direction.

21. The position detection device according to claim 1, wherein a plurality of the magnetic field sensors is arranged in the second-axis direction.

22. A lens module comprising:
a first magnetic field generator generating a first magnetic field;
a driver opposed to the first magnetic field generator in a first-axis direction and configured to generate a driving force to thereby cause the first magnetic field generator to move in a second-axis direction parallel to a first plane orthogonal to the first-axis direction;
a magnetic field sensor configured to detect a magnetic field component, of the first magnetic field, that is parallel to the first plane; and
a lens, wherein
the first magnetic field generator and the lens are movable together in the second-axis direction with respect to the driver and the magnetic field sensor,
the driver is spaced from and overlaps a part of the first magnetic field generator in the first-axis direction, and extends across the part of the first magnetic field generator in a third-axis direction parallel to the first plane and orthogonal to the second-axis direction, and
a center position of the magnetic field sensor in the third-axis direction is different from a center position of the first magnetic field generator in the third-axis direction.

23. An imaging apparatus comprising
an imaging element, and
a lens module,
the lens module including:
a first magnetic field generator generating a first magnetic field;
a driver opposed to the first magnetic field generator in a first-axis direction and configured to generate a driving force to thereby cause the first magnetic field generator to move in a second-axis direction parallel to a first plane orthogonal to the first-axis direction;

a magnetic field sensor configured to detect a magnetic field component, of the first magnetic field, that is parallel to the first plane; and a lens, wherein the first magnetic field generator and the lens are movable together in the second-axis direction with respect to the driver and the magnetic field sensor, the driver is spaced from and overlaps a part of the first magnetic field generator in the first-axis direction, and extends across the part of the first magnetic field generator in a third-axis direction parallel to the first plane and orthogonal to the second-axis direction, and a center position of the magnetic field sensor in the third-axis direction is different from a center position of the first magnetic field generator in the third-axis direction.

24. The imaging apparatus according to claim 23, further comprising a processor, wherein the lens has an optical axis along the second-axis direction, and the processor is configured to perform focusing on a subject by causing the driver to generate the driving force and thereby causing the first magnetic field generator and the lens to move along a direction of the optical axis.

25. The imaging apparatus according to claim 23, further comprising a processor, wherein the lens has an optical axis along the second-axis direction, and the processor is configured to perform focusing on a subject by causing the driver to generate the driving force and thereby causing the first magnetic field generator and the lens to move along a plane orthogonal to a direction of the optical axis.

26. An angle sensor apparatus comprising a rotating member, and a position detection device, the position detection device including:

a first magnetic field generator provided on the rotating member and generating a first magnetic field;

a driver opposed to the first magnetic field generator in a first-axis direction and configured to generate a driving force to thereby cause the first magnetic field generator and the rotating member to rotate in a rotating direction along the second-axis direction parallel to a first plane orthogonal to the first-axis direction; and a magnetic field sensor configured to detect a magnetic field component, of the first magnetic field, that is parallel to the first plane, wherein the first magnetic field generator and the rotating member are rotatable in the rotating direction along the second-axis direction with respect to the driver and the magnetic field sensor, the driver is spaced from and overlaps a part of the first magnetic field generator in the first-axis direction, and extends across the part of the first magnetic field generator in a third-axis direction parallel to the first plane and orthogonal to the second-axis direction, and a center position of the magnetic field sensor in the third-axis direction is different from a center position of the first magnetic field generator in the third-axis direction.

* * * * *